United States Patent
Zhang et al.

(10) Patent No.: US 12,554,915 B2
(45) Date of Patent: Feb. 17, 2026

(54) METHOD FOR IMPROVING CONSISTENCY IN MASK PATTERN GENERATION

(71) Applicant: ASML NETHERLANDS B.V., Veldhoven (NL)

(72) Inventors: Quan Zhang, San Jose, CA (US); Tatung Chow, San Jose, CA (US); Been-Der Chen, Milpitas, CA (US); Yen-Wen Lu, Saratoga, CA (US)

(73) Assignee: ASML NETHERLANDS B.V., Veldhoven (NL)

( * ) Notice: Subject to any disclaimer, the term of this patent is extended or adjusted under 35 U.S.C. 154(b) by 924 days.

(21) Appl. No.: 17/782,741

(22) PCT Filed: Nov. 21, 2020

(86) PCT No.: PCT/EP2020/082995
§ 371 (c)(1),
(2) Date: Jun. 6, 2022

(87) PCT Pub. No.: WO2021/115766
PCT Pub. Date: Jun. 17, 2021

(65) Prior Publication Data
US 2023/0044490 A1    Feb. 9, 2023

Related U.S. Application Data

(60) Provisional application No. 62/947,707, filed on Dec. 13, 2019.

(51) Int. Cl.
*G06F 30/30* (2020.01)
*G03F 1/36* (2012.01)
(Continued)

(52) U.S. Cl.
CPC .............. *G06F 30/398* (2020.01); *G03F 1/36* (2013.01); *G03F 1/70* (2013.01); *G03F 7/705* (2013.01); *G03F 7/70441* (2013.01)

(58) Field of Classification Search
None
See application file for complete search history.

(56) References Cited

U.S. PATENT DOCUMENTS

| | | | |
|---|---|---|---|
| 6,262,429 B1 * | 7/2001 | Rishton | H01J 37/3026 250/492.23 |
| 6,275,604 B1 * | 8/2001 | Miyajima | B82Y 40/00 382/199 |

(Continued)

FOREIGN PATENT DOCUMENTS

| | | |
|---|---|---|
| TW | 200944952 | 11/2009 |
| TW | 201523124 | 6/2015 |

(Continued)

OTHER PUBLICATIONS

Office Action issued in corresponding Korean Patent Application No. 10-2022-7019546, dated May 8, 2024.
(Continued)

*Primary Examiner* — Leigh M Garbowski
(74) *Attorney, Agent, or Firm* — Pillsbury Winthrop Shaw Pittman LLP

(57) ABSTRACT

A method of determining a mask pattern for a target pattern to be printed on a substrate. The method includes partitioning a portion of a design layout including the target pattern into a plurality of cells with reference to a given location on the target pattern; assigning a plurality of variables within a particular cell of the plurality of cells, the particular cell including the target pattern or a portion thereof; and determining, based on values of the plurality of variables, the mask pattern for the target pattern such that a performance metric of a patterning process utilizing the mask pattern is within a desired performance range.

20 Claims, 17 Drawing Sheets

(51) Int. Cl.
  *G03F 1/70* (2012.01)
  *G03F 7/00* (2006.01)
  *G06F 30/398* (2020.01)

(56) References Cited

U.S. PATENT DOCUMENTS

| | | | | |
|---|---|---|---|---|
| 6,285,783 | B1* | 9/2001 | Isomura | G06T 7/0002 |
| | | | | 382/140 |
| 6,401,235 | B1* | 6/2002 | Ashida | G03F 1/78 |
| | | | | 716/55 |
| 7,010,775 | B2* | 3/2006 | Ohmori | G03F 1/36 |
| | | | | 716/52 |
| 7,043,712 | B2* | 5/2006 | Mukherjee | G03F 1/36 |
| | | | | 716/52 |
| 7,131,104 | B2* | 10/2006 | Gallatin | G03F 1/36 |
| | | | | 716/53 |
| 7,587,704 | B2 | 9/2009 | Ye et al. | |
| 7,975,244 | B2* | 7/2011 | Mukherjee | G03F 1/68 |
| | | | | 430/30 |
| 9,696,618 | B2* | 7/2017 | Nakayama | G06F 30/392 |
| 10,671,052 | B2* | 6/2020 | Beylkin | G05B 19/4097 |
| 11,232,249 | B2 | 1/2022 | Zhang et al. | |
| 11,755,814 | B2* | 9/2023 | Chen | G06N 3/045 |
| | | | | 716/102 |
| 2005/0120327 | A1* | 6/2005 | Ye | G03F 7/004 |
| | | | | 716/52 |
| 2006/0222964 | A1* | 10/2006 | Futatsuya | G03F 1/36 |
| | | | | 430/394 |
| 2008/0276215 | A1 | 11/2008 | Higuchi et al. | |
| 2009/0064085 | A1* | 3/2009 | Bang | G03F 1/36 |
| | | | | 716/55 |
| 2009/0100396 | A1 | 4/2009 | Smayling et al. | |
| 2009/0157360 | A1 | 6/2009 | Ye et al. | |
| 2011/0099526 | A1 | 4/2011 | Liu | |
| 2017/0168385 | A1* | 6/2017 | Chang | G06F 30/392 |
| 2020/0050099 | A1 | 2/2020 | Su et al. | |

FOREIGN PATENT DOCUMENTS

| | | | | |
|---|---|---|---|---|
| TW | 201945829 | | 12/2019 | |
| WO | 2016096309 | | 6/2016 | |
| WO | WO-2016096309 A1 * | | 6/2016 | G03F 7/70125 |
| WO | 2018215188 | | 11/2018 | |
| WO | WO-2018215188 A1 * | | 11/2018 | G03F 1/36 |
| WO | 2018224349 | | 12/2018 | |
| WO | 2019162346 | | 8/2019 | |
| WO | 2019179747 | | 9/2019 | |
| WO | 2020108902 | | 6/2020 | |
| WO | 2020135946 | | 7/2020 | |

OTHER PUBLICATIONS

International Search Report and Written Opinion issued in corresponding PCT Patent Application No. PCT/EP2020/082995, dated Mar. 2, 2021.

Guirguis, D. et al.: "Evolutionary Black-Box Topology Optimization: Challenges and Promises", IEEE Transactions on Evolutionary Computation, vol. 24, No. 4, pp. 613-633 (Nov. 19, 2019).

Office Action issued in corresponding Taiwanese Patent Application No. 110147521 dated Nov. 9, 2022.

Office Action issued in corresponding Chinese Patent Application No. 202080086061.8, dated Oct. 16, 2024.

Office Action issued in corresponding Taiwanese Patent Application No. 110147521, dated Jun. 17, 2023.

* cited by examiner

METHOD FOR IMPROVING CONSISTENCY IN MASK PATTERN GENERATION

CROSS-REFERENCE TO RELATED APPLICATIONS

This application is the U.S. national phase entry of PCT Patent Application No. PCT/EP2020/082995 which was filed on Nov. 11, 2020, which claims the benefit of priority of U.S. Provisional Patent Application No. 62/947,707 which was filed on Dec. 13, 2019 and which is incorporated herein in its entirety by reference.

FIELD

The present disclosure relates to lithography technologies, and more particularly, to mechanisms of generating a patterning device pattern.

BACKGROUND

A lithography apparatus is a machine that applies a desired pattern onto a target portion of a substrate. Lithography apparatus can be used, for example, in the manufacture of integrated circuits (ICs). In that circumstance, a patterning device, which is alternatively referred to as a mask or a reticle, may be used to generate a circuit pattern corresponding to an individual layer of the IC, and this pattern can be imaged onto a target portion (e.g. comprising part of, one or several dies) on a substrate (e.g. a silicon wafer) that has a layer of radiation-sensitive material (resist). In general, a single substrate contain a network of adjacent target portions that are successively exposed. Known lithography apparatus include so-called steppers, in which each target portion is irradiated by exposing an entire pattern onto the target portion in one go, and so-called scanners, in which each target portion is irradiated by scanning the pattern through the beam in a given direction (the "scanning"-direction) while synchronously scanning the substrate parallel or anti parallel to this direction.

Prior to transferring the circuit pattern from the patterning device to the substrate, the substrate may undergo various processes, such as priming, resist coating and a soft bake. After exposure, the substrate may be subjected to other processes, such as a post-exposure bake (PEB), development, a hard bake and measurement/inspection of the transferred circuit pattern. This array of processes is used as a basis to make an individual layer of a device, e.g., an IC device. The substrate may then undergo various processes to produce the individual layer of the device, such as etching, ion-implantation (doping), metallization, oxidation, chemo-mechanical polishing, etc. If several layers are required in the device, then the whole procedure, or a variant thereof, can be repeated for each layer. Eventually, a device will be present in each target portion on the substrate. These devices are then separated from one another by a technique such as dicing or sawing, whence the individual devices can be mounted on a carrier, connected to pins, etc.

Thus, manufacturing semiconductor devices, typically involves processing a substrate (e.g., a semiconductor wafer) using a number of fabrication processes to form various features and multiple layers of the devices. Such layers and features are typically manufactured and processed using, e.g., deposition, lithography, etch, chemical-mechanical polishing, and ion implantation. Multiple devices may be fabricated on a plurality of dies on a substrate and then separated into individual devices. The device manufacturing typically includes a patterning process. A patterning process involves a patterning step, such as optical and/or nanoimprint lithography using a patterning device (e.g., a mask) in a lithographic apparatus, to transfer a pattern on the patterning device to a substrate and typically, but optionally, involves one or more related pattern processing steps, such as resist development by a development apparatus, baking of the substrate using a bake tool, etching using the pattern using an etch apparatus, etc.

SUMMARY

In an embodiment, there is provided a method of determining a mask pattern for a target pattern to be printed on a substrate. The method includes partitioning a portion of a design layout including the target pattern into a plurality of cells, each cell having a relationship with a given location on the target pattern; assigning a plurality of variables within a particular cell of the plurality of cells, the particular cell including the target pattern or a portion thereof; and determining, based on values of the plurality of variables, the mask pattern for the target pattern such that a performance metric of a patterning process utilizing the mask pattern is within a desired performance range. In an embodiment, the determining of the mask pattern includes simulating, using the target pattern and the plurality of variables, the patterning process to determine the values of the plurality of variables such that the performance metric of the patterning process is within the desired performance range; and generating, based on the determined values of the plurality of variables, the mask pattern for the target pattern.

Furthermore, in an embodiment, there is provided a non-transitory computer-readable media comprising instructions that, when executed by one or more processors, cause operations including partitioning a portion of a design layout including a target pattern into a plurality of cells, each cell having a relationship with a given or selected location on the target pattern; assigning a plurality of variables within a particular cell of the plurality of cells, the particular cell including the target pattern or a portion thereof; and determining, based on values of the plurality of variables, a mask pattern for the target pattern such that a performance metric of a patterning process utilizing the mask pattern is within a desired performance range. The determining of the mask pattern includes simulating, using the target pattern and the plurality of variables, the patterning process to determine the values of the plurality of variables such that the performance metric of the patterning process is within the desired performance range; and generating, based on the determined values of the plurality of variables, the mask pattern for the target pattern.

BRIEF DESCRIPTION OF THE DRAWINGS

Embodiments will now be described, by way of example only, with reference to the accompanying drawings in which.

DETAILED DESCRIPTION

Figure 1:
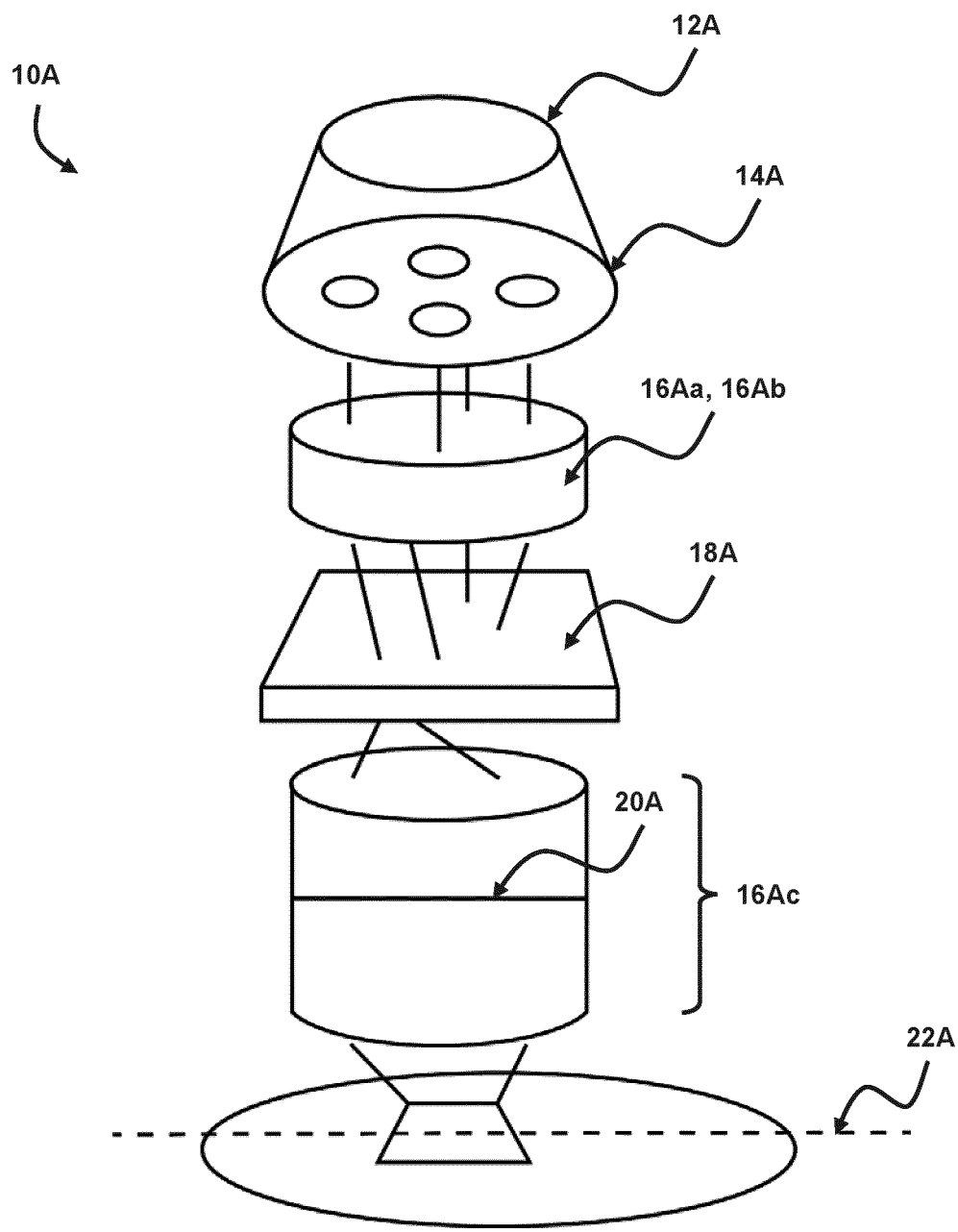
FIG. 1 shows a block diagram of various subsystems of a lithography system, according to an embodiment.

FIG. 1 illustrates an exemplary lithographic projection apparatus 10A in accordance with an embodiment of the present disclosure. The apparatus 10A includes a radiation source 12A, which may be a deep-ultraviolet (DUV) excimer laser source or other type of source including an extreme ultra violet (EUV) source. However, as discussed above, in some other embodiments, the radiation source may not be an integral part of the lithographic projection apparatus itself. The apparatus 10A further includes: illumination optics which, e.g., define the partial coherence (denoted as sigma) and which may include optics 14A, 16Aa and 16Ab configured to shape radiation from the source 12A; a patterning device 18A; and transmission optics 16Ac that project an image of the patterning device pattern onto a substrate plane 22A. An adjustable filter or aperture 20A at the pupil plane of the projection optics may restrict the range of beam angles that impinge on the substrate plane 22A, where the largest possible angle defines the numerical aperture of the projection optics NA=n sin(Θmax), wherein n is the refractive index of the media between the substrate and the last element of the projection optics, and Θmax is the largest angle of the beam exiting from the projection optics that can still impinge on the substrate plane 22A.

In a lithographic projection apparatus, a source provides illumination (i.e. radiation) to a patterning device and projection optics direct and shape the illumination, via the patterning device, onto a substrate. The projection optics may include at least some of the components 14A, 16Aa, 16Ab and 16Ac. An aerial image (AI) is the radiation intensity distribution at substrate level. A resist layer on the substrate is exposed and the aerial image is transferred to the resist layer as a latent "resist image" (RI) therein. The resist image (RI) can be defined as a spatial distribution of solubility of the resist in the resist layer. A resist model can be used to calculate the resist image from the aerial image, an example of which can be found in U.S. Patent Application Publication No. US 20090157360, the disclosure of which is hereby incorporated by reference in its entirety. The resist model is related to properties of the resist layer, e.g., effects of chemical processes which occur during exposure, PEB and development. Optical properties of the lithographic projection apparatus (e.g., properties of the source, the patterning device and the projection optics) dictate the aerial image. Since the patterning device used in the lithographic projection apparatus can be changed, it may be desirable to separate the optical properties of the patterning device from the optical properties of the rest of the lithographic projection apparatus including at least the source and the projection optics.

In an embodiment, assist features (sub resolution assist features and/or printable resolution assist features) may be placed into the design layout based on how the design layout is optimized according to the methods of the present disclosure. In an embodiment, a machine learning based model is used to determine a patterning device pattern. The machine learning model may be a neural network such as a convolution neural network that can be trained in a certain way to obtain accurate predictions at a fast rate, thus enabling a full-chip simulation of the patterning process.

A neural network may be trained (i.e., whose parameters are determined) using a set of training data. The training data may comprise or consist of a set of training samples. Each sample may be a pair of an input object (typically a vector, which may be called a feature vector) and a desired output value (also called the supervisory signal). A training algorithm analyzes the training data and adjusts the behavior of the neural network by adjusting the parameters (e.g., weights of one or more layers) of the neural network based on the training data. The neural network after training can be used for mapping new samples.

In the context of determining a patterning device pattern, the feature vector may include one or more characteristics (e.g., shape, arrangement, size, etc.) of the design layout comprised or formed by the patterning device, one or more characteristics (e.g., one or more physical properties such as a dimension, a refractive index, material composition, etc.) of the patterning device, and one or more characteristics (e.g., the wavelength) of the illumination used in the lithographic process. The supervisory signal may include one or more characteristics of the patterning device pattern (e.g., CD, contour, etc. of the patterning device pattern).

Given a set of N training samples of the form $\{(x_1, y_1), (x_2, y_2), \ldots, (x_N, y_N)\}$, where $x_i$ is the feature vector of the i-th example and $y_i$ is its supervisory signal, a training algorithm seeks a neural network g: X→Y, where X is the input space and Y is the output space. A feature vector may be an n-dimensional vector of numerical features that represent some object. The vector space associated with these vectors is often called the feature space. It is sometimes convenient to represent g using a scoring function f: X×Y→ $\mathbb{R}$ such that g is defined as returning the y value that gives the highest score $$g(x) = \operatorname*{argmax}_{y} f(x, y).$$

Let F denote the space of scoring functions.

The neural network may be probabilistic where g takes the form of a conditional probability model g(x)=P(y|x), or f takes the form of a joint probability model f(x, y)=P(x, y).

Two approaches may be used to choose f or g: empirical risk minimization and structural risk minimization. Empirical risk minimization seeks the neural network that best fits the training data. Structural risk minimization includes a penalty function that controls the bias/variance tradeoff. For example, in an embodiment, the penalty function may be based on a cost function, which may be a squared error, number of defects, EPE, etc. The functions (or weights within the function) may be modified so that the variance is reduced or minimized.

In both cases, it is assumed that the training set comprises or consists of one or more samples of independent and identically distributed pairs $(x_i, y_i)$. In an embodiment, in order to measure how well a function fits the training data, a loss function $L: Y \times Y \to \mathbb{R}^{\geq 0}$ is defined. For training sample $(x_i, y_i)$, the loss of predicting the value $\hat{y}$ is $L(y_i, \hat{y})$.

The risk $R(g)$ of function g is defined as the expected loss of g. This can be estimated from the training data as $$R_{emp}(g) = \frac{1}{N} \sum_i L(y_i, g(x_i)).$$

In an embodiment, machine learning models of the patterning process can be trained to predict, for example, contours, patterns, CDs for a mask pattern, and/or contours, CDs, edge placement (e.g., edge placement error), etc. in the resist and/or etched image on a wafer. An objective of the training is to enable accurate prediction of, for example, contours, aerial image intensity slope, and/or CD, etc. of the printed pattern on a wafer. The intended design (e.g., a wafer target layout to be printed on a wafer) is generally defined as a pre-Optical Proximity Correction (OPC) design layout which can be provided in a standardized digital file format such as GDSII or OASIS or other file format.

Figure 2:
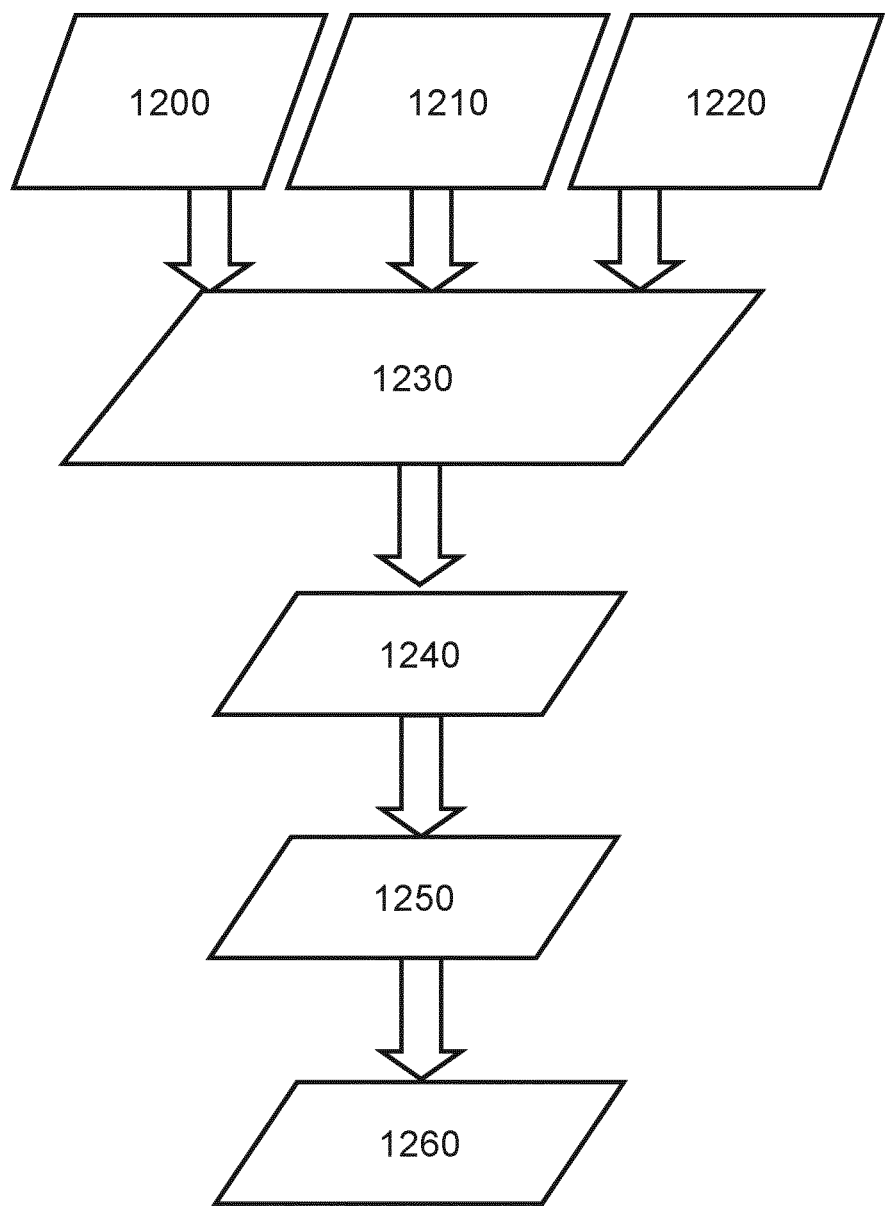
FIG. 2 depicts an example flow chart for modeling and/or simulating at least part of a patterning process, according to an embodiment.

An exemplary flow chart for modelling and/or simulating parts of a patterning process is illustrated in FIG. 2. As will be appreciated, the models may represent a different patterning process and need not comprise all the models described below. A source model 1200 represents optical characteristics (including radiation intensity distribution, bandwidth and/or phase distribution) of the illumination of a patterning device. The source model 1200 can represent the optical characteristics of the illumination that include, but not limited to, numerical aperture settings, illumination sigma ($\sigma$) settings as well as any particular illumination shape (e.g. off-axis radiation shape such as annular, quadrupole, dipole, etc.), where $\sigma$ (or sigma) is outer radial extent of the illuminator.

A projection optics model 1210 represents optical characteristics (including changes to the radiation intensity distribution and/or the phase distribution caused by the projection optics) of the projection optics. The projection optics model 1210 can represent the optical characteristics of the projection optics, including aberration, distortion, one or more refractive indexes, one or more physical sizes, one or more physical dimensions, etc.

The patterning device/design layout model module 1220 captures how the design features are laid out in the pattern of the patterning device and may include a representation of detailed physical properties of the patterning device, as described, for example, in U.S. Pat. No. 7,587,704, which is incorporated by reference in its entirety. In an embodiment, the patterning device/design layout model module 1220 represents optical characteristics (including changes to the radiation intensity distribution and/or the phase distribution caused by a given design layout) of a design layout (e.g., a device design layout corresponding to a feature of an integrated circuit, a memory, an electronic device, etc.), which is the representation of an arrangement of features on or formed by the patterning device. Since the patterning device used in the lithographic projection apparatus can be changed, it is desirable to separate the optical properties of the patterning device from the optical properties of the rest of the lithographic projection apparatus including at least the illumination and the projection optics. The objective of the simulation is often to accurately predict, for example, edge placements and CDs, which can then be compared against the device design. The device design is generally defined as the pre-OPC patterning device layout, which may be provided in a standardized digital file format such as GDSII or OASIS.

An aerial image 1230 can be simulated from the source model 1200, the projection optics model 1210 and the patterning device/design layout model 1220. An aerial image (AI) is the radiation intensity distribution at substrate level. Optical properties of the lithographic projection apparatus (e.g., properties of the illumination, the patterning device and the projection optics) dictate the aerial image.

A resist layer on a substrate is exposed by the aerial image and the aerial image is transferred to the resist layer as a latent "resist image" (RI) therein. The resist image (RI) can be defined as a spatial distribution of solubility of the resist in the resist layer. A resist image 1250 can be simulated from the aerial image 1230 using a resist model 1240. The resist model 1240 can be used to calculate the resist image from the aerial image, an example of which can be found in U.S. Patent Application Publication No. US 20090157360, the disclosure of which is hereby incorporated by reference in its entirety. The resist model typically describes the effects of chemical processes which occur during resist exposure, post exposure bake (PEB) and development, in order to predict, for example, contours of resist features formed on the substrate and so it typically related only to such properties of the resist layer (e.g., effects of chemical processes which occur during exposure, post-exposure bake and development). In an embodiment, the optical properties of the resist layer, e.g., refractive index, film thickness, propagation and polarization effects may be captured as part of the projection optics model 1210.

In general, the connection between the optical and the resist model is a simulated aerial image intensity within the resist layer, which arises from the projection of radiation onto the substrate, refraction at the resist interface and multiple reflections in the resist film stack. The radiation intensity distribution (aerial image intensity) is turned into a latent "resist image" by absorption of incident energy, which can be further modified by diffusion processes and various loading effects. Efficient simulation methods that are fast enough for full-chip applications approximate the realistic 3-dimensional intensity distribution in the resist stack by a 2-dimensional aerial (and resist) image.

In an embodiment, the resist image can be used an input to a post-pattern transfer process model module 1260. The post-pattern transfer process model 1260 defines performance of one or more post-resist development processes (e.g., etch, development, etc.).

Simulation of the patterning process can, for example, predict contours, CDs, edge placement (e.g., edge placement error), etc. in the resist and/or etched image. Thus, the objective of the simulation is to accurately predict, for example, edge placement, and/or aerial image intensity slope, and/or CD, etc. of the printed pattern. These values can be compared against an intended design to, e.g., correct the patterning process, identify where a defect is predicted to occur, etc. The intended design is generally defined as a pre-OPC design layout which can be provided in a standardized digital file format such as GDSII or OASIS or other file format.

Thus, the model formulation describes most, if not all, of the known physics and chemistry of the overall process, and each of the model parameters desirably corresponds to a distinct physical or chemical effect. The model formulation thus may set an upper bound on how well the model can be used to simulate the overall manufacturing process.

Continuous Transmission Mask (CTM) technique is an inverse lithography solution that can generate a grayscale guidance map for a mask pattern. Based on the grayscale guidance map, assist features and modifications to main features of a design layout can be extracted. In an embodiment, such guidance map can be used to generated polygon shaped features (e.g., main features, assist features, SRAFs, SERIFs, etc.). Masks manufactured using patterns generated using CTM+ techniques are referred as curvilinear masks. In an embodiment, a CTM+ technique involves determining a guidance map using a level-set method, where a level-set threshold values assist in determining the curved polygon shaped features (e.g., main features, assist features, SRAFs, SERIFs, etc.).

An example method of generating a curvilinear mask is discussed in PCT patent publication number WO 2019179747 A1, which is incorporated herein in its entirety by reference. In the example method (e.g., CTM, CTM+ or combined CTM and CTM+), a guidance map is generated by optimizing a grayscale image with respect to a performance metric (e.g., EPE, sidelobe etc.) related to lithography. The method can be used to generate an optimized curvilinear mask pattern, which includes curvilinear polygons traced from the grayscale image.

In another example method, a full-chip capability is enabled with patch boundary handling, as discussed in U.S. patent application No. 62/785,981 filed on Dec. 28, 2018, which is incorporated herein in its entirety by reference. The discussed method ensures seamless transition of different patch results without any degradation of the results introduced by patch boundary.

In another example method, to make sure the mask manufacturability, image based MRC method is discussed in U.S. patent application No. 62/773,475 filed on Nov. 30, 2018, which is incorporated herein in its entirety by reference. This example method helps to regulate a mask pattern geometry such that MRC are satisfied.

To reduce the runtime of a full-chip mask generation with an aforementioned method, a machine learning based method can be used, as discussed in PCT patent publication number WO 2018215188 A1, which is incorporated herein in its entirety by reference. The machine learning based method trains a machine learning model to predict the grayscale image corresponding to an optimized mask pattern using DCNN framework. The predicted grayscale image is very close to a "ground truth," hence with only a small number of iterations (e.g., less than the iterations needed in the inverse lithography solution) a final curvilinear mask pattern can be generated.

The aforementioned CTM and CTM+ techniques involve iterative optimization using grid based pattern modification. Such grid based modification may generate different CTM for a target pattern if the grid locations of the target pattern change. Also, as commonly known, inverse lithography has the problem of having multiple solutions, that solutions with small or even clear differences might all be considered as acceptable solutions when judged by lithographic performance (DOF, PVB, etc.).

Figures 3A, 3B:
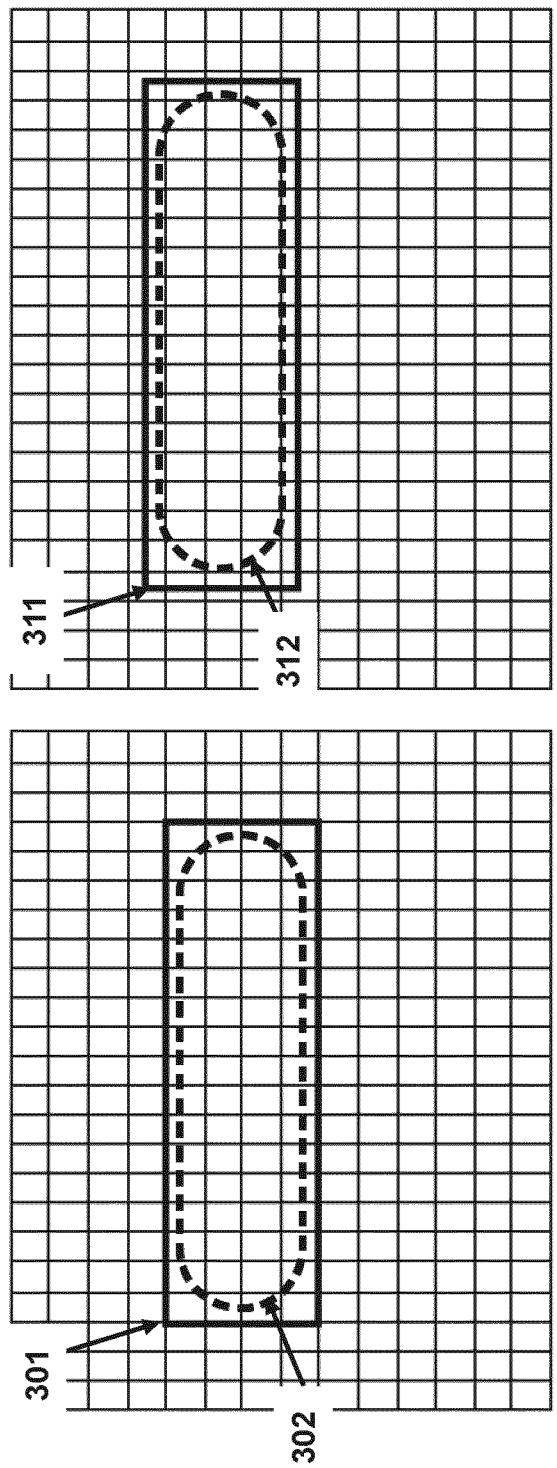
FIGS. 3A and 3B illustrate an example grid dependency error related to simulating of a patterning process, according to an embodiment.

FIGS. 3A-3B illustrate example pattern shifting with respect to a grid causing grid-dependency error. The FIGS. 3A and 3B show, a predicted contour 302/312 (dotted) and input contour 301/311 (e.g., design or desired contour). In FIG. 3A, the entire input contour 301 is on the grid, however in FIG. 3B, a portion of the input contour 311 is off-grid e.g., at corner point. This can cause a difference between model predicted contours 302 and 312. In an embodiment, e.g., Lithography Manufacturability Check (LMC) or OPC applications, the same pattern may be presented repeatedly at different locations on the grid, and it is desired to have an invariant model prediction, regardless of the pattern's position. However, the models can hardly achieve a perfect shift-invariance. Some ill-conditioned model may give large contour difference in pattern shifts.

In an embodiment, a Grid Dependency (GD) error may be measured as follows. To measure the GD error, the pattern and a gauge along the contour are shifted together in a sub-pixel step. For example, for pixel size=14 nm, the pattern/gauge may be shifted by 1 nm per step along r- and/or y-direction. With each shift, a model predicted CD along the gauge is measured. Then, the variance in the set of model predicted CDs indicates the grid dependency error. Such differences in predicted contours may not be acceptable from a user's point of view. For the same target pattern, customers, OPC engineers or other patterning process related users may prefer to use the same mask to ensure better control on process variation.

The grid dependency problem may extend to the application of the inverse lithography such as used to generate CTM and CTM+. As a CTM/CTM+ generation process goes through iterative optimization to generate results (grayscale mask map and/or curvilinear mask in correspondence), the results for the same target patterns may become more and more different during the optimization due to the effect of the model grid dependency, and due to other treatments in CTM/CTM+ that might cause additional grid dependency, in each iterative steps. The grid dependency problem may also extend to the application of the machine learning based methods used for speeding up e.g., Sub-Resolution Assistant Feature (SRAF) generation. For example, as different solutions exist in ground truth data itself, it causes the machine learning model training difficult to converge to better model with lower RMS from the ground truth result. Also, machine learning based methods are also source of grid dependency, when they are applied to predict results. In the present disclosure, a method (e.g., 400) is discussed to reduce the variation of CTM/CTM+ results, and thus improve the consistency.

Figure 4A:
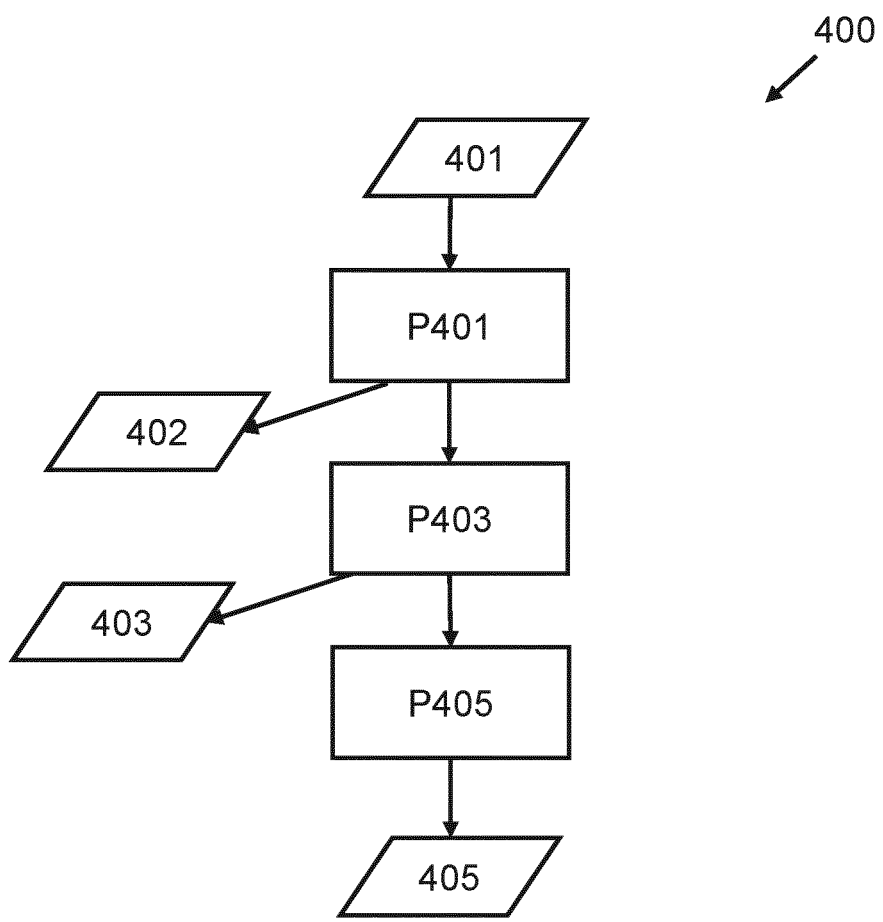
FIGS. 4A and 4B is a flow chart for generating a mask pattern, according to an embodiment.

FIG. 4A is a flow chart of an example method of determining one or more mask patterns for any design layout including one or more target patterns in accordance with an embodiment of the present disclosure. For example, a mask layout including one or more mask patterns corresponding to one or more target patterns such as memory circuitry, can be generated. Further, a mask employing the mask layout can be used to print the target pattern on a substrate.

In an embodiment, the method 400 includes several steps or process and when executed (e.g., via a processor or a computer hardware system) generates a mask pattern for a desired pattern (e.g., the target pattern).

Process P401 involves partitioning a portion of a design layout 401 into a plurality of cells 402, each cell having a relationship with a given location (or a selected location) on the target pattern. In an embodiment, the relationship can be an equivalence relationship (e.g., symmetry) that is satisfied by each cell. In an embodiment, the relationship may be represented as function between the given location and a boundary, for example, a minimum distance between a boundary of each cell to the given location. Such relationship can be used to determine boundaries of each cell that results in partitioning of the design layout 401. In an embodiment, the given location is a center of the target pattern, a point on an edge of the target pattern, or any points determined by a predefined geometric relation (e.g., distance, trigonometric, etc.) to the target patterns. In an embodiment, the design layout 401 includes a plurality of target patterns (e.g., holes, bars, lines, etc.), and their given locations can be centers of the target patterns, points on the edges of the target patterns, or points having the same geometric relations to the target patterns.

In an embodiment, the partitioning of the portion of the design layout is based on geometric partitioning, for example by using a Voronoi method, wherein boundaries of each cell of the plurality of cells 402 are determined based on a distance between a boundary of the cell and the given location on the target pattern. In an embodiment, the boundaries of each cell of the plurality of cells 402 are determined that points in the each cell are closest to the given location than other locations within the design layout.

In an embodiment, the design layout is associated with a first coordinate system, and the plurality of cells 402 are associated with a second coordinate system. In an embodiment, the first coordinate system refers to coordinate system used in the existing methods (e.g., CTM/CTM+ methods in the previously mentioned patent publication WO 2019179747 A1, patent application PCT/EP2019/081574, and PCT/EP2019/079562).

In an embodiment, the second coordinate system is defined such that an origin is at a base point (e.g., a point from the target design, or a corner) of a cell, a first axis is perpendicular to the target feature's edge, a second axis is perpendicular the first axis (or other equivalent choices of defining the coordinate system). In an embodiment, for example, the base point can be a point placed at an edge of the target pattern. In an embodiment, the design layout includes the multiple target patterns; a base point may be placed at each edge or dissected edge of each target pattern to define an origin of a particular cell; and coordinates can be defined with respect to the origin related to each of the target pattern.

Figure 5:
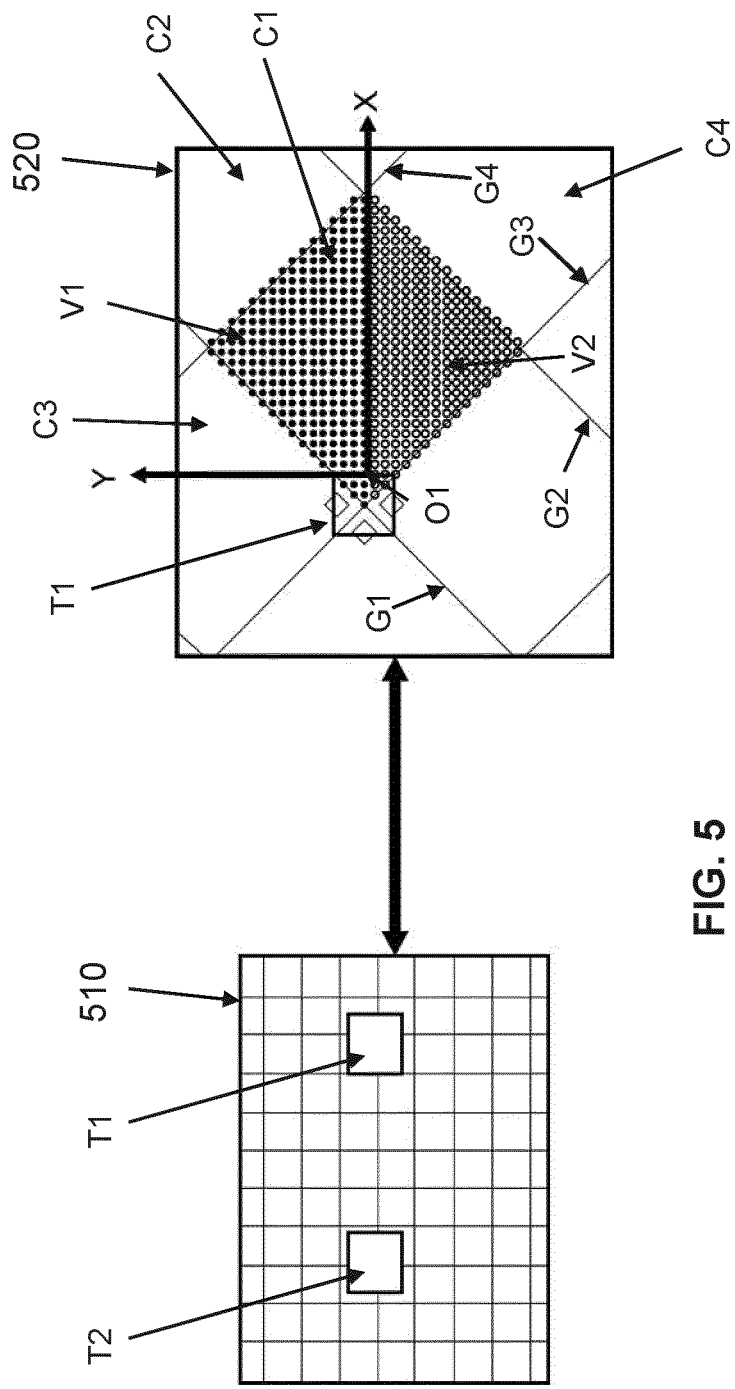
FIG. 5 is an example conversion between a first coordinate system and a second coordinate system, according to an embodiment.

FIG. 5 illustrates an exemplary first coordinate system and an exemplary second coordinate system in accordance with an embodiment of the present disclosure. For example, the first coordinate system can be represented as a grid of a patch 510 of the design layout. In an embodiment, the origin in the first coordinate system may be a corner (e.g., bottom left corner) of the patch 510 and the x-direction and the y-direction may be along the horizontal and vertical lines of the grid. As shown, the grid is defined by placing equidistance vertical lines and equidistance horizontal lines. When a target pattern (e.g., T1) is placed on such grid, the target pattern can be described using the grid. The grid of the patch 510 is similar to a grid discussed with respect to FIGS. 3A and 3B.

Referring to the patch 520 in FIG. 5, the second coordinate system is defined such that an origin O1 is at an edge of the target pattern T1, the x-direction is perpendicular to the edge, and the y-direction is parallel to the edge. In an embodiment, the origin can be an evaluation point or a geometric point associated with the edge or a dissected edge of the target pattern T1. In an embodiment, evaluation points are anticipated measurement points (e.g., placed at edges of the target pattern) to determine a physical characteristic such as CD, EPE, etc. For example, an origin O1 can be an EPE evaluation point located at a center of an edge of the target pattern. Thus, any variable (e.g., one represented by the dots within the cell C1 in FIG. 5) can be described (e.g., coordinates, distance, etc.) with reference to the origin (e.g., a center point of dissected edge) thereby providing a consistent reference point for any similar target pattern (e.g., T2). In an embodiment, each dot corresponds to a discrete location (e.g., a pixel location) which is a variable. In an embodiment, each dot corresponds to a value associated with each discrete location (e.g., intensity value of a pixel at the location), such value can be a variable. On the other hand, using the grid of the patch 510 does not provide such consistency. On the contrary, the grid of the patch 510 (or the grid of FIGS. 3A and 3B) introduced grid dependency errors in the evaluation and resulting OPC patterns.

Referring back to FIG. 4A, process P403 involves assigning a plurality of variables 403 within a particular cell of the plurality of cells 402, the particular cell including the target pattern or a portion thereof. In an embodiment, the assigning also involves assigning initial values to the plurality of variables 403. As shown in FIG. 5, cell C1 includes a portion of the target pattern T1. The plurality of variables 403 may be referred as CTM variables whose values can be modified (e.g., during a patterning process simulation, CTM/CTM+ simulations, etc.) based on a performance metric (e.g., used in a process simulation) to achieve a desired performance. The initial values of the plurality of variables may be assigned in any suitable manner, e.g., user defined values, random values, or other initial values determined for faster convergence of CTM/CTM+ simulation, without departing from the scope of the present disclosure. In an embodiment, the plurality of variables 403 correspond to a plurality of pixels, and a value of a given variable of the plurality of variables is intensity associated with a given pixel or combination of pixels, of the plurality of pixels. The intensity value of pixel can be indicative of an edge of a feature contour (e.g., OPC features such as SRAF). For example, if the intensity values are represented on a scale 0 to 1, then intensity values greater than or equal to 0.75 indicate edge pixels, while an intensity value less than 0.75 may indicate a non-edge pixel. In other words, as the intensity values change, an edge may appear or disappear, eventually resulting in a pattern (e.g., SRAF) to be used in a mask pattern.

In an embodiment, the values of the plurality of variables 403 are in the second coordinate system and are convertible to values in the first coordinate system. An example conversion is discussed with reference to FIG. 5 herein.

Process P405 involves determining, based on values of the plurality of variables 403, the mask pattern 405 for the target pattern such that a performance metric of a patterning process utilizing the mask pattern is within a desired range. In an embodiment, determining the mask pattern 405 involves simulating, using the target pattern and the plurality of variables 403, the patterning process to determine the values of the plurality of variables 403 such that the performance metric of the patterning process is within the desired performance range; and generating, based on the determined values of the plurality of variables 403, the mask pattern 405 for the target pattern.

Figure 4B:
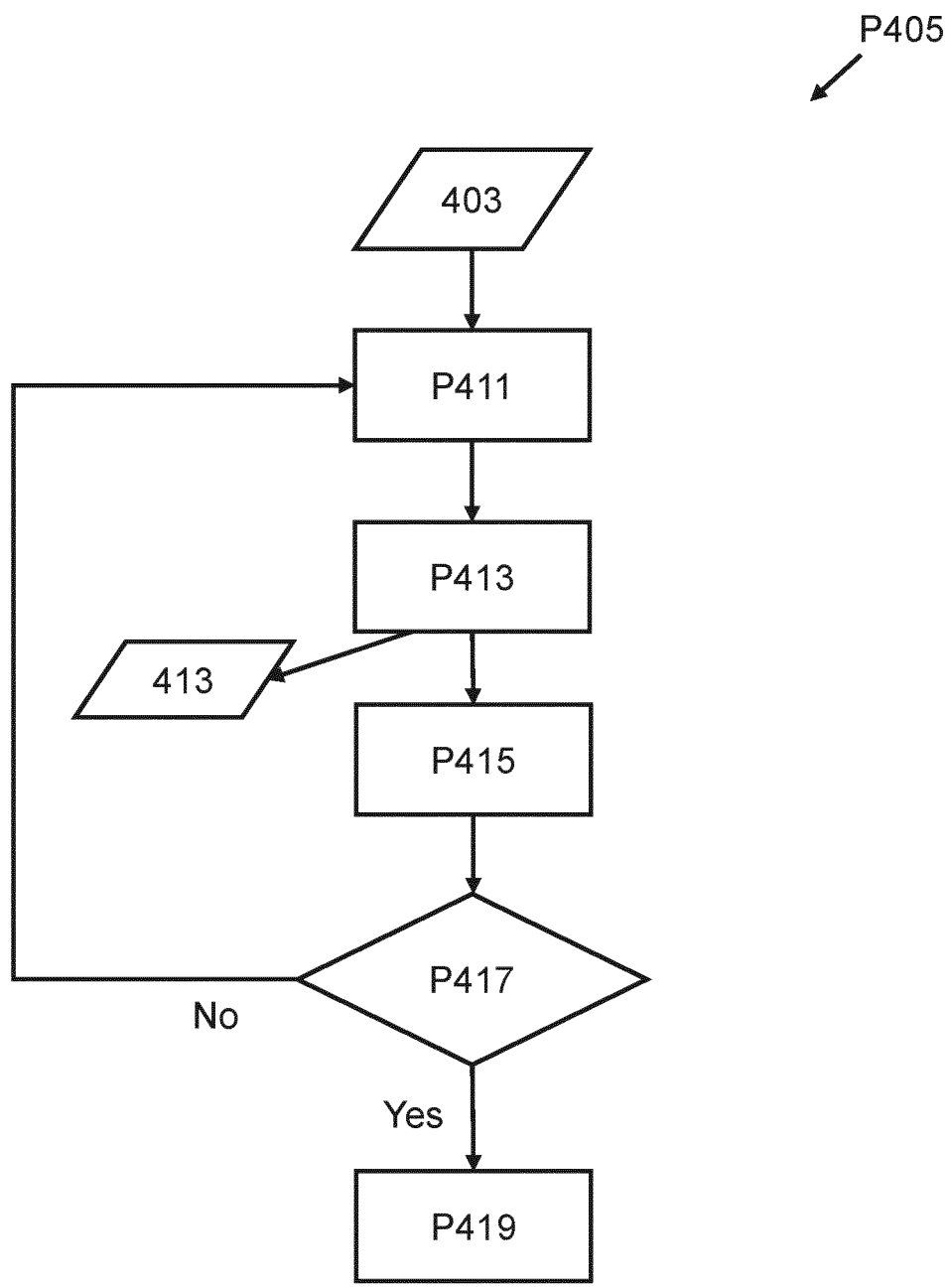

In an embodiment, determining the mask pattern(s) involves an iterative process. FIG. 4B illustrates an example flow chart for the process P405 that includes sub-processes such as P411-P419 discussed in detail as follows.

Process P411 involves adjusting values of one or more variables of the plurality of variables 403 of the particular cell. In an embodiment, adjusting values of the one or more variables involve adjusting intensities within the particular cell. The adjusting implies changing values of the one or more variables within the particular cells associated with the target pattern. For example, referring to FIG. 5, the values of a set of variables V1 are changed (e.g., increased or decreased). In an embodiment, the values of one or more variables (e.g., in set V1) can be any values between 0 to 1, −1 to 1, 0 to 100, 100 to 1000, or other real or integer value ranges. For example, variables close to an edge of the target pattern T1 can be changed to a relatively higher value compared to variables away from the target pattern T1. In a first iteration, the initial values of the set of variables may be same and in a subsequent iteration, the variable values at the edge may be increased and values away from the edge may be decreased. In further subsequent iteration, the variables values may be increased or decreased from the values in the previous iteration. In an embodiment, a gradient map associated with a performance metric (e.g., CD, EPE) can be used as a guide to change the values of the variables. For example, the gradient map can be a map of first derivative of the EPE with respect to the variables V1. In an embodiment, the process P411 is repeated for all the cell (e.g., cells C1-C4 in FIG. 4).

Process P413 involves converting the adjusted values of the one or more variables to the first coordinate system of the design layout. For example, the adjusted values of the one or more variables (e.g., of V1) in the cells (e.g., C1, C2, C3, C4, in FIG. 5) can be converted to the first coordinate system of the patch as mask image or GDS format so that an impact of the adjusted values of the variables can be evaluated. For example, the impact can be evaluated via simulating a patterning process e.g., discussed with FIG. 2. In an embodiment, the impact can be evaluated using CTM or CTM+ simulation process flows (e.g., discussed in the previously mentioned patent applications WO 2019179747 A1, 62/785, 981, and 62/773,475). Thus, the converting of the adjusted values from the second coordinate system to the first coordinate system allows evaluating their impact on the performance metric so that a desired performance can be achieved.

In an embodiment, the converting the adjusted values of the one or more variables involves establishing a correlation between the first coordinate system of the design layout and the second coordinate system of the plurality of cells 402. For example, referring to FIG. 5, a correlation between the cells (e.g., C1, C2, C3, etc.) of a patch 520 and a grid of a patch 510 is established. In an embodiment, the correlation can be a mathematical function that can map a geometry of the target pattern described in the first coordinate system to the geometry described in the second coordinate system. Based on the correlation, the adjusted values of the one or more variables can be converted from the second coordinate system to the first coordinate system of the design layout. Then, using the converted values 413 of the one or more variables, simulation the patterning process can be performed to determine the performance metric.

In an embodiment, the plurality of variables 403 are correlated to a plurality of pixels, and a value of a given variable of the plurality of variables is intensity associated with a given pixel or combination of pixels, of the plurality of pixels.

FIG. 5 illustrates an example of converting values between the first coordinate system and the second coordinate system. For example, the first coordinate system refers to a coordinate system used to describe a design layout. In an embodiment, the first coordinate system describes a target pattern with respect to a predetermined grid such as a grid of patch 510 of the design layout. Typically, the grid of the patch 510 includes equidistant vertical lines and equidistant horizontal lines. Then, positions (e.g., coordinates, relative position with respect to neighboring features, etc.) and/or geometry (e.g., shape, size, etc.) of target patterns (e.g., T1 and T2) can be described with respect to the grid. In an embodiment, a cell of the grid may be fully occupied, partially occupied, or may not be occupied by the target pattern T1 (or T2). In existing methods of CTM/CTM+ used to determine OPC, position of the target pattern with respect to the grid or the first coordinate system can be undesirably critical when determining optical proximity corrections (OPC) for generating a mask pattern. For example, as discussed with reference to FIGS. 3A and 3B, grid dependency errors may be introduced in the OPC. Such grid dependency error results in inconsistent mask patterns. For example, a mask pattern may have different OPC corresponding to a plurality of same target pattern (e.g., contact holes of 40 nm).

On the other hand, according to an embodiment of the present disclosure, the patch of the design layout is partitioned, e.g., as shown in patch 520. The patch 520 includes a target feature T1 and a space of the patch 520 is divided into cells C1, C2, C3, C4 and so on. In an example, the patch 520 may be partitioned by applying the Voronoi method that results in cells C1, C2, C3, C4 around the target pattern T1. These Voronoi cells are in a different coordinate system than the first coordinate system of 510. Hence, any variables e.g., a set of variables V1 and V2, defined within a particular cell (e.g., C1) of the patch 520 will have a different positioning with respect to the grid of the patch 510. In the patch 520, the set of variables V1 are represented by dots, where each dot represents a different variable. In an embodiment, the one or more dots pixels and the values can be pixel intensities.

Thus, in the present example, the values of the variables such as V1 and V2 are converted to values corresponding to the grid of the patch 510. In an embodiment, a set of variables V1 are a plurality of pixels, and a value of a given variable of the plurality of variables is intensity. Then, values of the variables V1 can be converted to the first coordinate system (e.g., of 510) by taking a sum or weighted sum of intensities of the pixels associated with the target pattern T1 in the patch 520. Similarly, the values in the first coordinate system can be converted to the second coordinate system, for example, by taking an inverse of the mathematical function. Thus, when a patterning process simulation determines an OPC correction at an edge of the target pattern T1 or assist features around the target pattern T1, the OPC corrections can be converted based on values of variables V1 and vice versa.

Figure 8:
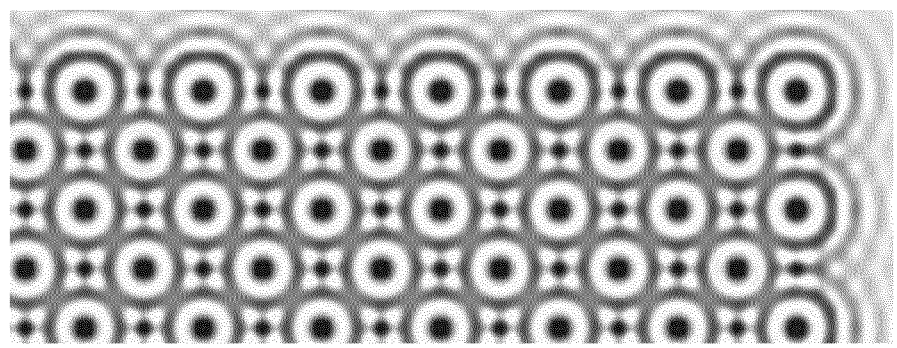
FIG. 8 is an exemplary continuous transmission map (CTM) generated using the method of FIG. 4A.

Referring back to FIG. 4B, process P415 involves determining, via simulating the patterning process using the converted values of the one or more variables, the performance metric of the patterning process. In an embodiment, the performance metric comprises: an edge placement error between the target pattern and a simulated pattern generated by the simulation of the patterning process, critical dimension (CD) of the simulated pattern, and/or a CD error between the simulated pattern and the target pattern. In an embodiment, the performance metric can be a number of extra (e.g., assist features) and insufficient (e.g., an incomplete feature) printing of mask features compared to the target patterns. Process P417 involves determining whether the performance metric is within the desired performance range. Process P419 involves, responsive to the performance metric being within the desired performance range, determining the mask pattern 405 based on the adjusted values. In an embodiment, responsive to the performance metric not being the desired performance range, or iteration steps not achieving desired settings (e.g., 100), repeating steps P411-P417 until the desired performance metric is achieved or desired number of iterations (e.g., 100) is reached. FIG. 8 illustrates an example CTM map generated using the exemplary method 400 according to an embodiment of the present disclosure.

In an embodiment, generating the mask pattern 405 for the target patterns involves converting the values of the plurality of variables into pixelated images, which is a mathematical representation of a grayscale mask image (e.g., CTM), or which generates a curvilinear mask pattern as a level-set function (e.g., CTM+).

In an embodiment, the method 400 involves applying the values of the plurality variables determined using the target pattern to other instances of the target pattern in the design layout; and determining, based on the applied values to the instances of the target pattern, the mask pattern 405 so that all instances of the target pattern are modified in a consistent manner to generate the mask pattern. For example, referring to FIG. 5, the values of the variables V1 associated with the target feature T1 are used to generate a grey scale image. In an embodiment, the target feature T1 may appear at multiple locations in the design layout, then the same values of V1 may be used for multiple patterns thereby generating a mask pattern having consistent OPC correction for same target features.

In an embodiment, the method 400 further includes determining a symmetric portion between the plurality of the cells or within the particular cell; and assigning a same set of variables to the symmetric portion of each cell of the plurality of cell. In an embodiment, symmetric portions can be determined based on a geometric similarity between the plurality of cells 402 or within the particular cell. For example, if the target pattern in FIG. 5 is a repetitive contact array, all the cells like C1, C2, C3 and C4 are symmetric, and thus could be represented by the one same set of variables. In addition, if each cell is flip/mirror symmetric, variables V1 in part (triangular portion) of the cell C1 can represent the other parts e.g., a mirror symmetric part (e.g., another triangular portion) having variables V2.

Employing such symmetric based variable allocation can advantageously reduce the dimension of variable set by orders of magnitude. For example, if there are 1000 instances of cells that are all symmetric to each other, and in each cell there are 100 variables, by using symmetry based variable allocation, the number of variables is reduced by 1000 times. Thus, the simulation of the patterning process is based on such reduced number of variable thereby possible making the patterning process simulation or OPC determining much faster than using full set of variable. In addition, results of OPC related to such reduced variables (e.g., 100 variables) can be used at many target features throughout the design layout (e.g. 1000 instances), thereby achieving consistency in the mask pattern employing the determined OPC.

Figure 6:
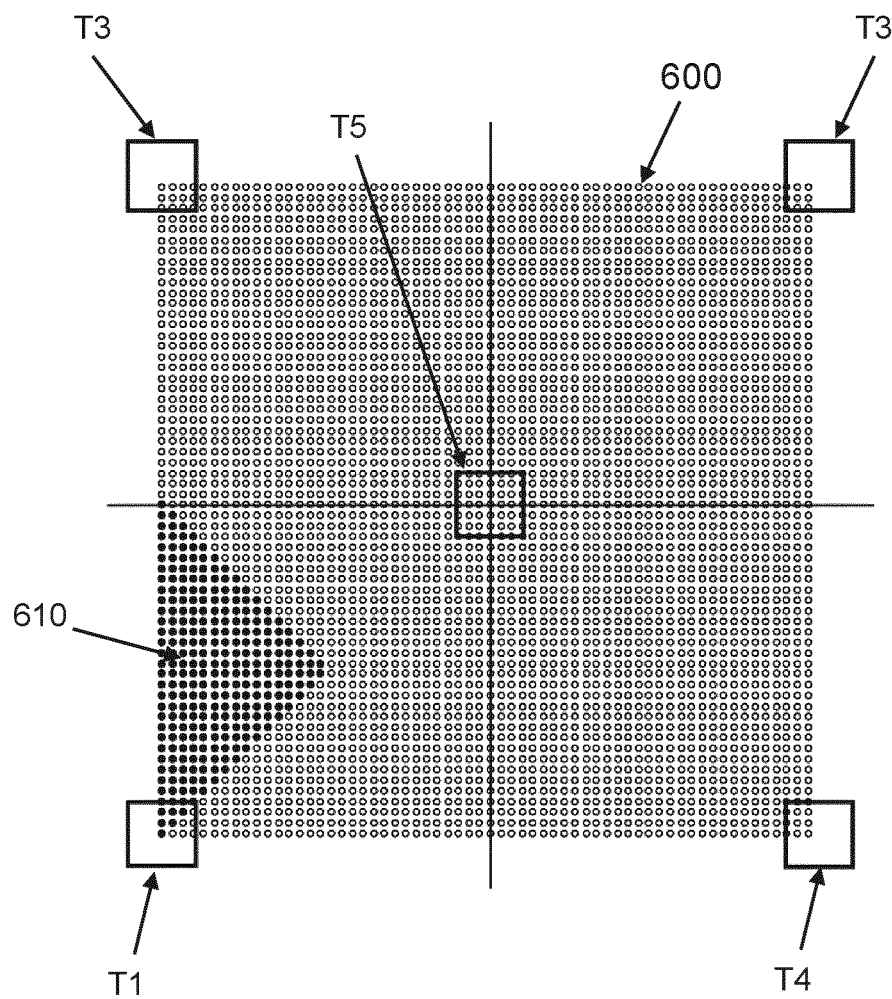
FIG. 6 is an example of partitioning cell and a plurality of variables assigned in the cell related to the method of FIG. 4A, according to an embodiment.

FIG. 6 illustrates a different example of space partition and symmetric based variable allocation in accordance with an embodiment of the present disclosure. In FIG. 6, a patch of the design pattern includes target features T1, T2, T3, T4, and T5, all of which are part of an infinite repetition of contact array patterns. The patch is partitioned into a plurality of cells based on the pitch repetitions between target patterns in the space to be partitioned, and a particular cell 600 (e.g., the square covering, or partially covering, target features T1-T5) is shown. Within the cell 600, the dots represent the variables assigned to the cell. In an embodiment, a symmetric portion (e.g., a triangular portion) are assigned the same set of variables 610. For example, the cell 600 includes 16 symmetric portions (e.g., represented by a triangle shape). In the present example, the set of variables 610 are assigned within a triangle portion (an example of the symmetric portion) and these same variables 610 can be applied to rest of the cell 600. In an embodiment, the symmetric portion having variables 610 can be referred as a repeating mode, as the values of the variables 610 can be repeated to cover the whole space of the infinite repetition of contact array patterns. In an embodiment, this method could be used for the center of array patterns (that could be represented by an infinite array) with given pitches of repetition, as an alternative to the geometric partitioning based on target pattern geometries.

In an embodiment, the method 400 further involves performing an optical proximity correction (OPC) process using the mask pattern 405 as an initial pattern, where the OPC process involves modifying the mask pattern to determine an optical proximity corrected mask pattern. In an embodiment, the mask pattern is modified such that a performance metric of the patterning process is improved. For example, improving the performance metric can be minimizing an edge placement error between the target pattern and a simulated pattern generated by the simulation of the patterning process, minimizing a number of extra and insufficient printing of mask features compared to the target patterns, minimizing a CD error between the simulated pattern and the target pattern, or a combinations thereof. It will be appreciated that any other suitable OPC process or mechanism of improving a performance metric can be used without departing from the scope of the present disclosure.

Figure 7A:
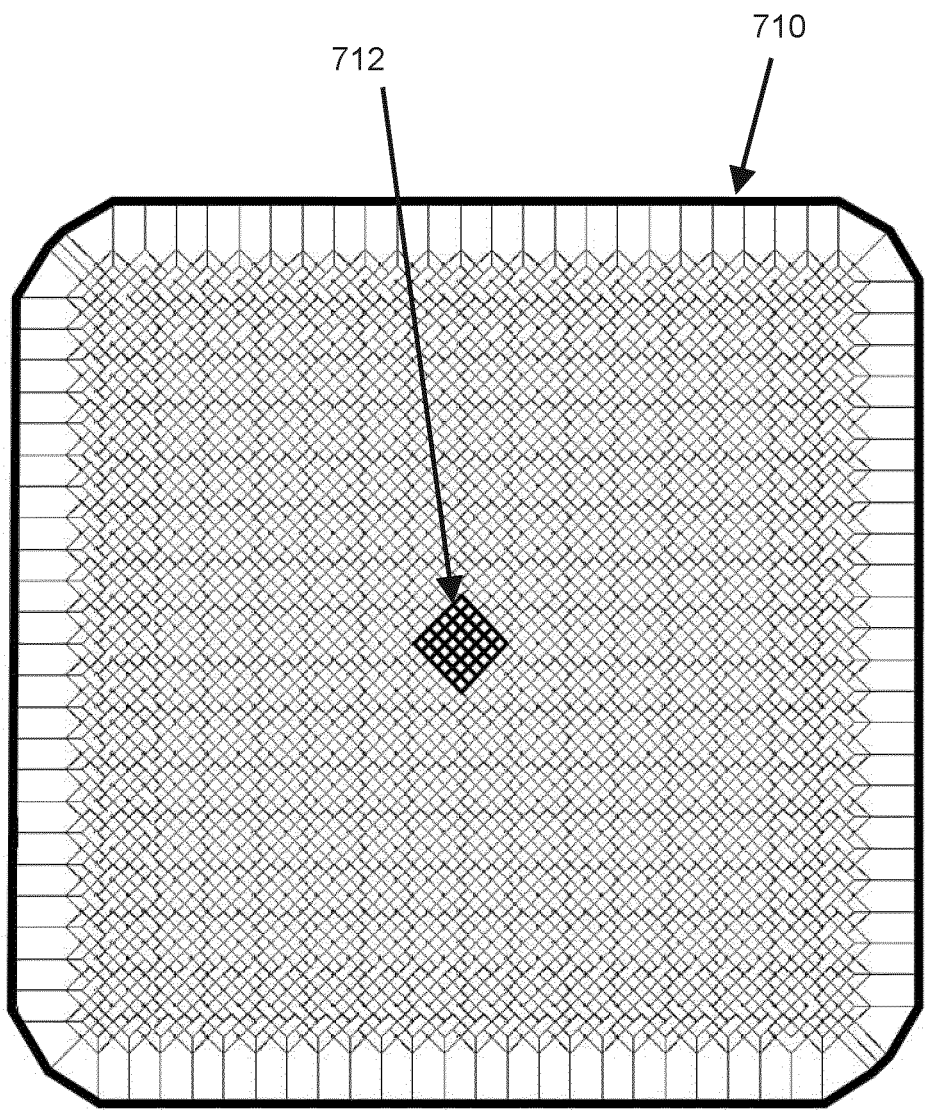
FIG. 7A is an exemplary design layout space partitioned according to the method of FIG. 4A.
Figure 7B:
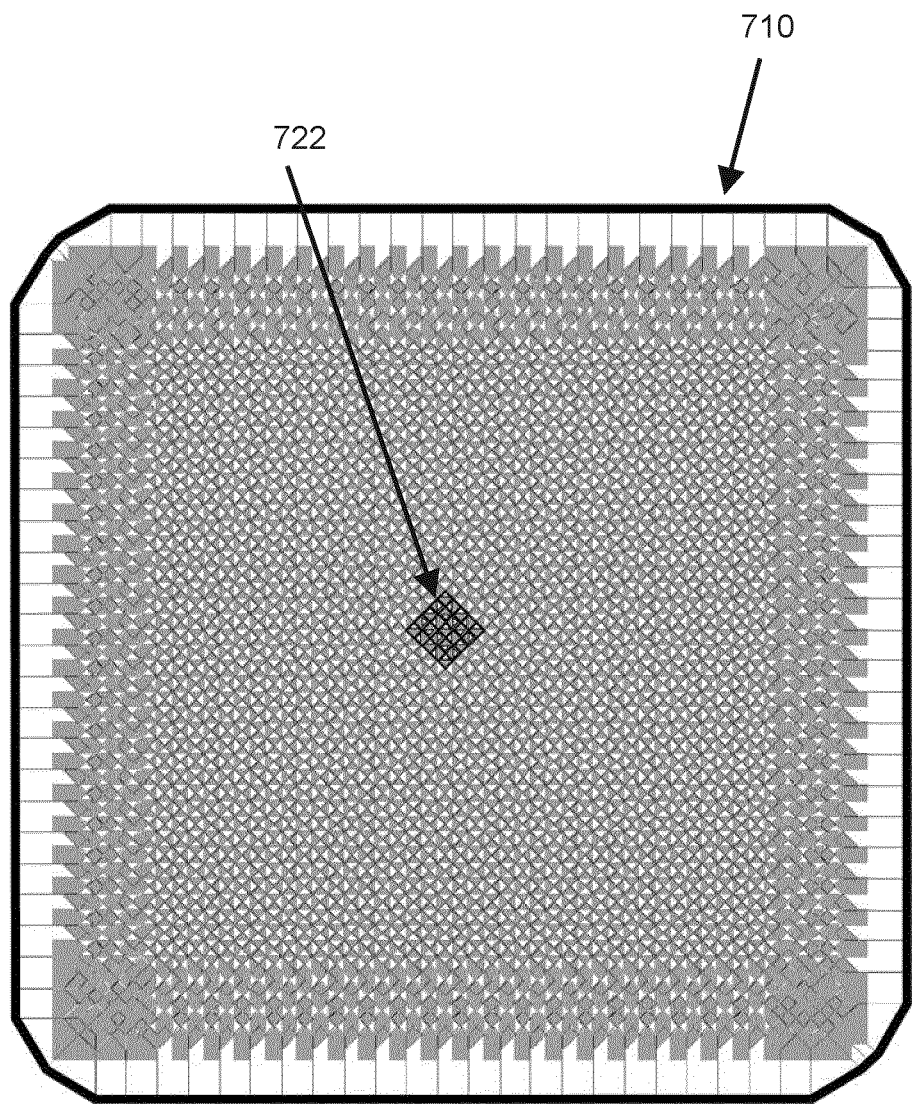
FIG. 7B is an example of variable in non-repeating mode according to an embodiment.
Figure 7C:
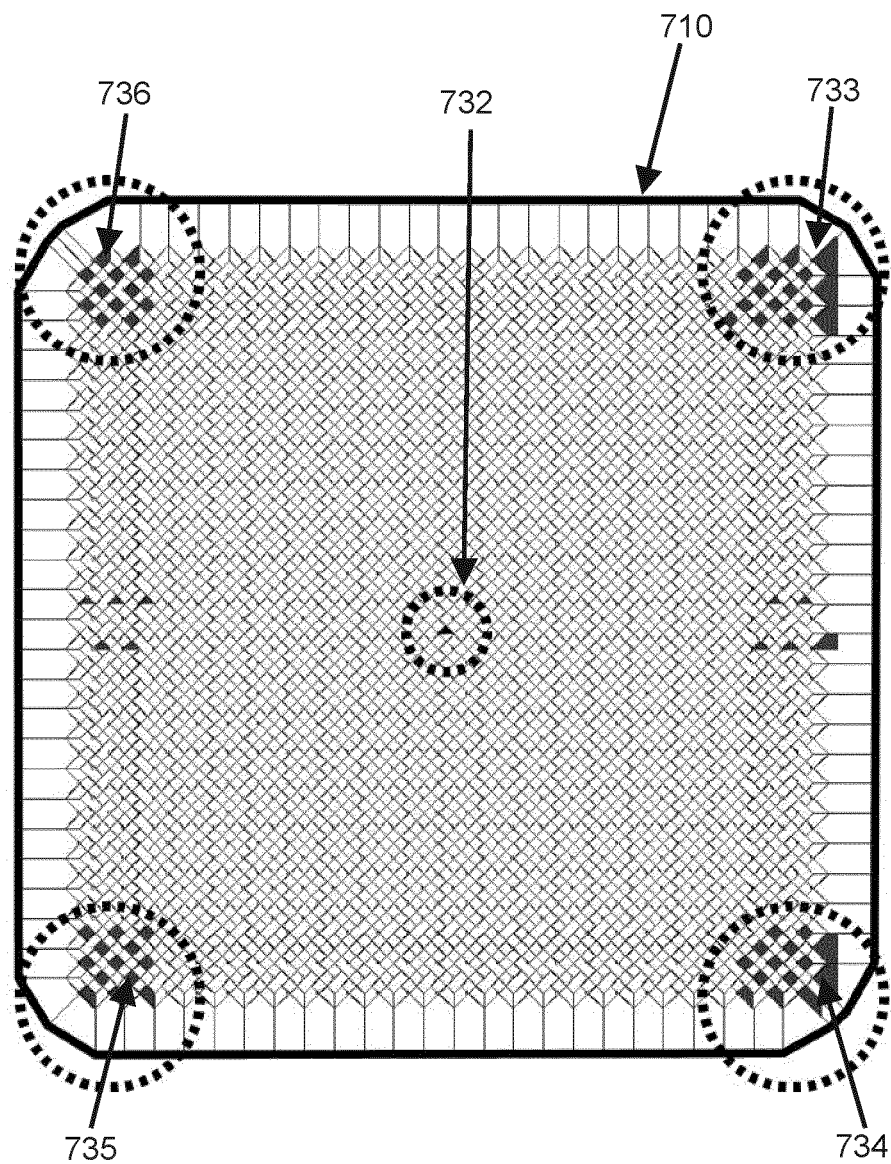
FIG. 7C illustrates example of variables in a repeating mode according to an embodiment.

FIGS. 7A-7C shows a pictorial comparison of repeating mode (e.g., symmetric portions) and non-repeating mode (e.g., not using symmetric portions). FIG. 7A illustrates an example design layout 710, which is partitioned into a plurality of cells 712 (e.g., Voronoi cells using Voronoi method). FIG. 7B illustrates a plurality of variables 722 (e.g., shaded regions) assigned to each cell of the plurality of cells 712. As the plurality of variables of each cell are treated independently without accounting for symmetries, the number of variables can be significant. On the other hand, as show in FIG. 7C according to an embodiment of the present disclosure, when symmetric portions are identified and then the number of variables are significantly reduced. For example, variables at 732, 733, 734, 735 and 736 need to be adjusted. Then, the results associated with the variables at 732-736 can be applied to their respective symmetric portions of different cells. Thus, comparing the shaded portions of the non-repeating mode (in 7B) and the shaded portions of the repeating mode (in 7C) shows a significant reduction in dimensionality or number of variables. This significantly improves consistency in mask patterns.

Figure 9:
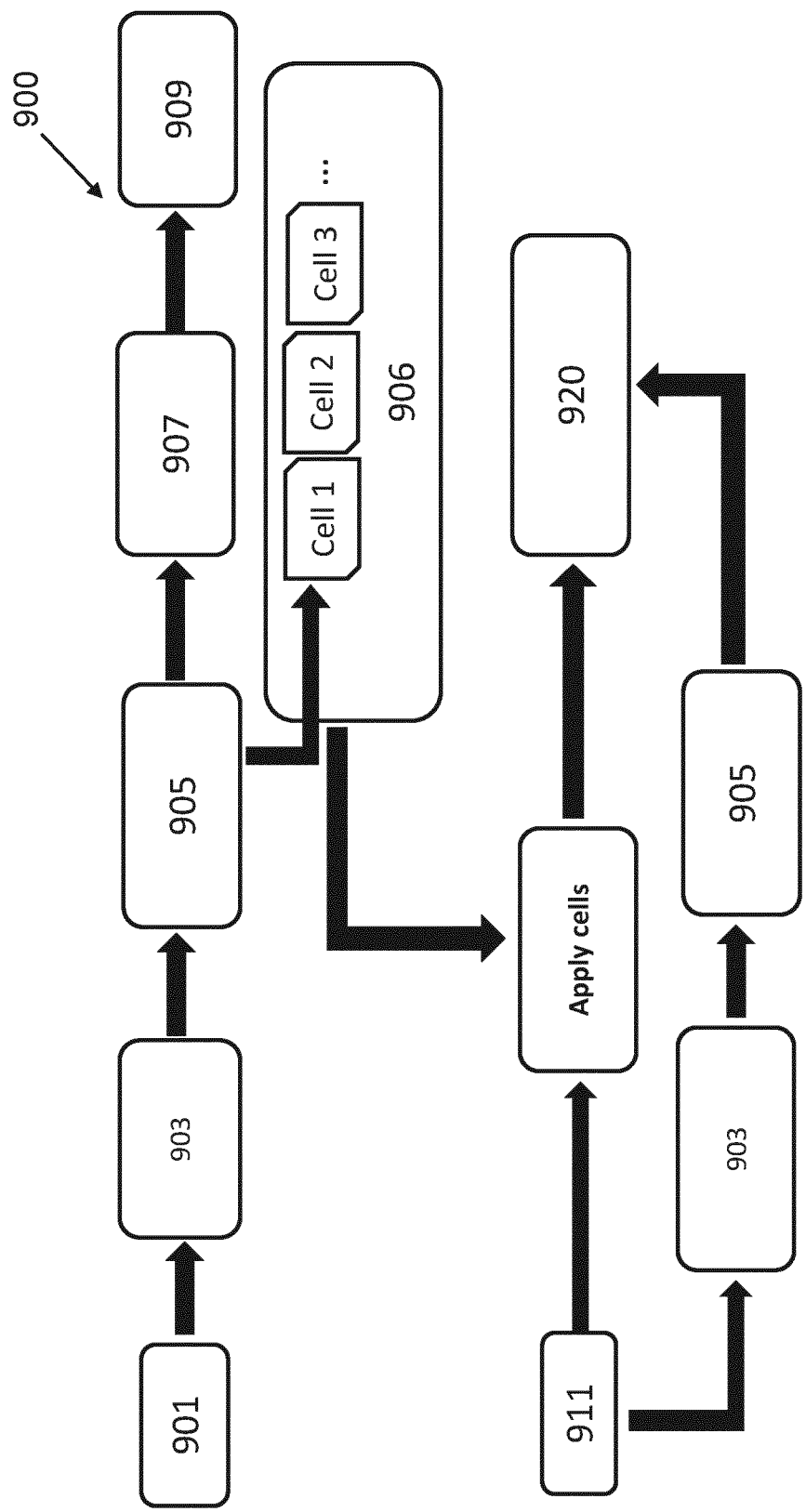
FIG. 9 is a flowchart of an exemplary method for determining mask pattern for a full-chip using the results of the method of FIG. 4A, according to an embodiment.

FIG. 9 is a flow chart of an exemplary full-chip OPC simulation process using results of the method 400 in accordance with an embodiment of the present disclosure. For example, the results (e.g., adjusted values), associated with the plurality of variables 403 of the cells, can be classified by geometry (e.g., holes having a particular, lines having a particular CD, distance between adjacent features, etc.) of corresponding target patterns, and stored as a database library. This database library then can be loaded by during determining OPC for a mask pattern. Then, the stored results in the database library can be applied to geometrically matching target patterns. The stored results could be applied directly or with minor adjustments, without need of rerunning lengthy simulation process.

In an embodiment, the results related to the plurality of cells associated with a target pattern (e.g., T1 and T2 of FIG. 5) can also be used for training a machine learning model. As mentioned earlier, to reduce the runtime of a full-chip mask pattern generation using CTM/CTM+ processes, machine learning using Deep Convolution Neural Network (DCNN) (e.g. discussed in U.S. patent application Ser. No. 16/606,791) based methods are developed to predict the grayscale image corresponding to an optimized mask pattern that is very close to the "ground truth." However, mask consistency requirement may not be satisfied using OPC tools. For improving the consistency of both CTM and CTM+, the method 400 can be employed for training the machining learning model, as it could enable a new way for full-chip application. The training method 900 of FIG. 9 advantageously has the capability to generate results in much shorter runtime, with much higher consistency, and is fully compatible with existing methods of curvilinear patch boundary handling and machine learning methods (e.g., Newron Freeform). The method of FIG. 9 gives great benefit to handling of highly repetitive layouts like memory patterns, and is also beneficial for random logic layout. The method is also applicable to the CTM method, possible serve as a supplemental to e.g., a machine learning based SRAF method.

The method of FIG. 9 can be divided into two stages: (i) a data generation stage—that generates a "result library" using the method 400, and (ii) a full-chip application stage—in which the "result library" is applied to a full design layout or target layout along with a machine learning model to generate a curvilinear model. The stages are discussed in detail as follows.

In process 900, a selected clips of target pattern 901 can be used to generate an initial CTM/CTM+ map 903 for a CTM/CTM+ generation or optimization process 905. In an embodiment, the initial map 903 can be optimized using an optimization process 905 to generate an optimized image 907 for CTM, and an optimized image phi (φ) 907 (e.g., polygons from a level-set output) and a curvilinear mask pattern 907 for CTM+. This result 907 can be used to train a machine learning model 909 as discussed in U.S. patent application Ser. No. 16/606,791, which is incorporated herein in its entirety by reference.

In an embodiment, the optimization process 905 may involve an inverse lithography (e.g., CTM such as in the PCT patent publication WO 2019179747 A1) based simulation, a level-set based method (e.g., CTM+) simulation, a machine learning model based CTM generation (e.g., in U.S. patent application Ser. No. 16/606,791), or a combination thereof. In an embodiment, the method 400 can be integrated with the CTM process 905 as discussed in FIGS. 4A and 4B. Accordingly, the selected target patterns 901 may be partitioned into a plurality of cells, wherein each cell can include a plurality of CTM variables. Then, the values of the CTM variables can be adjusted according to the CTM optimization process 905 (e.g., optimizing to improve a performance metric such as EPE). The values of such CTM variables of each cell (or symmetric portions of the cells) can be associated with the selected target patterns 901 and stored in a result library 906.

In an embodiment, the result library 906 includes optimized CTM variable values for selected target patterns. In an embodiment, the design layout may include other target patterns. In an embodiment, the selected target patterns may be patterns of the design layout that appear frequently at different locations, a critical pattern, a hot spot pattern, etc. In an embodiment, a coverage analysis can be performed to select few patterns from the design layout that are representative of the entire design layout or cover, for example, more than 90% of the patterns. For example, the design layout may include millions or even billions of patterns, and only 100000, 10000, or 1000 patterns may be selected as target patterns. Thus, for each selected pattern (e.g., 1000 patterns) the result library may include a cell (e.g., 1000 cells corresponding to 100 patterns) and corresponding variable values. For example, each selected target pattern of 901 can be associated with a unique cell identifier to locate the corresponding results from the result library 906.

In a second step of method 900, the result library 906 can be used for full-chip layout 911 and generate a mask pattern for the full-chip. In an embodiment, the full-chip layout includes a plurality of target patterns, e.g., include one or more of the selected target patterns 901 for which the result library 906 was generated in the first step.

In the second step, the full-chip layout 911 can be partitioned in the same manner, as in the first step, into a plurality of cells. Then, during mask pattern generation, for one or more cells of the full-chip layout 911 corresponding to the selected target pattern 901, results can be loaded from the result library 906. For other pattern for which results are not available in the result library 906, a separate CTM process including CTM generation 903 and CTM optimization 905 can be performed. The results from CTM optimization 905 and the result library 906 are combined together to generate a final mask pattern 920 corresponding to the full-chip layout 911. Such mask pattern 920 can be generated with much less runtime cost (as no optimization is needed) and much easier in boundary handling (as result is more consistent).

For a full-chip layout including highly repetitive patterns (e.g., a memory layout), it is possible to generate results of all possible cells, and therefore it doesn't require additional optimization when generating full-chip mask pattern.

However, for a full-chip layout that has more variations of patterns, typically like a random logic layout, it might be less likely to create results of all cells in the full-chip layout within a reasonable computational cost. In such situation, the results library can be generated with the selection of layouts that are for example relatively critical, repetitive, or typical. Then, for cells that are included in the result library (e.g., 906), the results could be directly loaded during e.g., CTM/CTM+ optimization or generation process. For others, the CTM/CTM+ generation process 903 may be initialized using e.g., a machine learning model predictions, allowing some iterations of the optimization 905 to produce good lithographic performance. Thus the method 900 implementing the method 400 is compatible to existing deep learning based CTM or CTM+ generation methods.

In an embodiment, the methods discussed herein may be provided as a computer program product or a non-transitory computer readable medium having instructions recorded thereon, the instructions when executed by a computer implementing the operation of the methods 400 and 900 discussed above.

Figure 10:
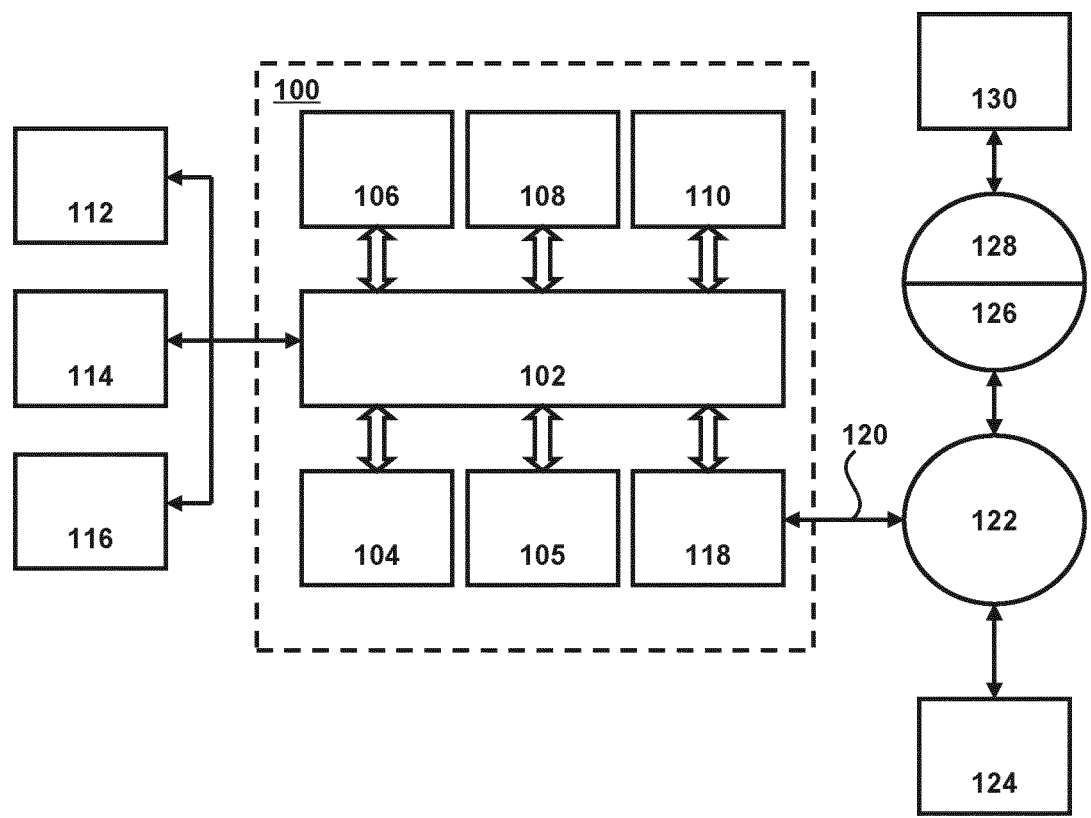
FIG. 10 is a block diagram of an exemplary computer system, according to an embodiment.

For example, an example computer system 100 in FIG. 10 includes a non-transitory computer-readable media (e.g., memory) comprising instructions that, when executed by one or more processors (e.g., 104), cause operations including partitioning a portion of a design layout including a target pattern into a plurality of cells, each cell having a relationship with a given location on the target pattern;

assigning a plurality of variables within a particular cell of the plurality of cells, the particular cell including the target pattern or a portion thereof; and determining, based on values of the plurality of variables, a mask pattern for the target pattern such that a performance metric of a patterning process utilizing the mask pattern is within a desired performance range. In an embodiment, the determining of the mask pattern includes simulating, using the target pattern and the plurality of variables, the patterning process used to determine the values of the plurality of variables such that the performance metric of the patterning process is within the desired performance range; and generating, based on the determined values of the plurality of variables, the mask pattern for the target pattern.

In an embodiment, as discussed earlier, the partitioning the portion of the design layout is based on geometric partitioning, for example, a Voronoi method, where boundaries of each cell of the plurality of cells are determined based on a distance to the given location on the target pattern.

In an embodiment, as discussed earlier, the design layout is associated with a first coordinate system, and the plurality of cells are associated with a second coordinate system, wherein the values of the plurality of variables are represented in the second coordinate system and are convertible to values represented in the first coordinate system. In an embodiment, the second coordinate system is defined such that an origin is at a base point of each cell, a first axis is perpendicular to an edge, a second axis is perpendicular the first axis.

In an embodiment, as discussed earlier, the determining of the mask pattern is an iterative process includes (a) adjusting values of one or more variables of the plurality of variables of a particular cell; (b) converting the adjusted values of the one or more variables to the first coordinate system of the design layout; (c) determining, via simulating the patterning process using the converted values of the one or more variables, the performance metric of the patterning process; (d) determining whether the performance metric is within the desired performance range; (e) responsive to the performance metric being within the desired performance range, determining the mask pattern based on the adjusted values; and (f) responsive to the performance metric not being the desired performance range, performing (a)-(e).

In an embodiment, as discussed earlier, the converting the adjusted values of the one or more variables includes establishing a correlation between the first coordinate system of the design layout and the second coordinate system of the plurality of cells; converting, based on the correlation, the adjusted values of the one or more variables from the second coordinate system to the first coordinate system of the design layout; and simulating the patterning process using the converted values of the one or more variables.

In an embodiment, as discussed earlier, the plurality of variables correspond to a plurality of pixels, and a value of a given variable of the plurality of variables is intensity associated with a given pixel or combination of pixels of the plurality of pixels.

In an embodiment, the non-transitory computer-readable media further store executable instructions that cause operations including: applying the values of the plurality variables determined using the target pattern to other instances of the target pattern in the design layout; and determining, based on the applied values to the instances of the target pattern, the mask pattern so that all instances of the target pattern are modified in a consistent manner to generate the mask pattern.

In an embodiment, the non-transitory computer-readable media further store executable instructions that cause operations including: determining a symmetric portion between the plurality of the cells or within the particular cell; and assigning a same set of variables to the symmetric portion of each cell of the plurality of cell.

In an embodiment, the non-transitory computer-readable media further store executable instructions that cause operations including classifying the values of the plurality of variables of the plurality of cells based on the geometry of corresponding target patterns; storing the values of the plurality of the variables in a result library; and determining, based on the result library, a mask pattern corresponding to a full-chip layout.

In an embodiment, as discussed earlier, the determining of the mask pattern for the full-chip layout includes: identifying patterns of the full-chip layout by geometrically matching the full-chip layout to the target patterns stored in the result library; extracting the values of the plurality variable corresponding to the identified pattern; and applying the of the extracted values to determine the mask pattern for the full-chip layout.

FIG. 10 is a block diagram that illustrates an exemplary computer system 100 configured to assist in implementing methods and flows disclosed herein in accordance with an embodiment of the present disclosure. Computer system 100 includes a bus 102 or other communication mechanism for communicating information, and a processor 104 (or multiple processors 104 and 105) coupled with bus 102 for processing information. Computer system 100 also includes a main memory 106, such as a random access memory (RAM) or other dynamic storage device, coupled to bus 102 for storing information and instructions to be executed by processor 104. Main memory 106 also may be used for storing temporary variables or other intermediate information during execution of instructions to be executed by processor 104. Computer system 100 further includes a read only memory (ROM) 108 or other static storage device coupled to bus 102 for storing static information and instructions for processor 104. A storage device 110, such as a magnetic disk or optical disk, is provided and coupled to bus 102 for storing information and instructions.

Computer system 100 may be coupled via bus 102 to a display 112, such as a cathode ray tube (CRT) or flat panel or touch panel display for displaying information to a computer user. An input device 114, including alphanumeric and other keys, is coupled to bus 102 for communicating information and command selections to processor 104. Another type of user input device is cursor control 116, such as a mouse, a trackball, or cursor direction keys for communicating direction information and command selections to processor 104 and for controlling cursor movement on display 112. This input device typically has two degrees of freedom in two axes, a first axis (e.g., x) and a second axis (e.g., y), that allows the device to specify positions in a plane. A touch panel (screen) display may also be used as an input device.

According to one embodiment, portions of the process may be performed by computer system 100 in response to processor 104 executing one or more sequences of one or more instructions contained in main memory 106. Such instructions may be read into main memory 106 from another computer-readable medium, such as storage device 110. Execution of the sequences of instructions contained in main memory 106 causes processor 104 to perform the process steps described herein. One or more processors in a multi-processing arrangement may also be employed to execute the sequences of instructions contained in main memory 106. In an alternative embodiment, hard-wired circuitry may be used in place of or in combination with software instructions. Thus, the description herein is not limited to any specific combination of hardware circuitry and software.

The term "computer-readable medium" as used herein refers to any medium that participates in providing instructions to processor 104 for execution. Such a medium may take many forms, including but not limited to, non-volatile media, volatile media, and transmission media. Non-volatile media include, for example, optical or magnetic disks, such as storage device 110. Volatile media include dynamic memory, such as main memory 106. Transmission media include coaxial cables, copper wire and fiber optics, including the wires that comprise bus 102. Transmission media can also take the form of acoustic or light waves, such as those generated during radio frequency (RF) and infrared (IR) data communications. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, and EPROM, a FLASH-EPROM, any other memory chip or cartridge, a carrier wave as described hereinafter, or any other medium from which a computer can read.

Various forms of computer readable media may be involved in carrying one or more sequences of one or more instructions to processor 104 for execution. For example, the instructions may initially be borne on a magnetic disk of a remote computer. The remote computer can load the instructions into its dynamic memory and send the instructions over a telephone line using a modem. A modem local to computer system 100 can receive the data on the telephone line and use an infrared transmitter to convert the data to an infrared signal. An infrared detector coupled to bus 102 can receive the data carried in the infrared signal and place the data on bus 102. Bus 102 carries the data to main memory 106, from which processor 104 retrieves and executes the instructions. The instructions received by main memory 106 may optionally be stored on storage device 110 either before or after execution by processor 104.

Computer system 100 also desirably includes a communication interface 118 coupled to bus 102. Communication interface 118 provides a two-way data communication coupling to a network link 120 that is connected to a local network 122. For example, communication interface 118 may be an integrated services digital network (ISDN) card or a modem to provide a data communication connection to a corresponding type of telephone line. As another example, communication interface 118 may be a local area network (LAN) card to provide a data communication connection to a compatible LAN. Wireless links may also be implemented. In any such implementation, communication interface 118 sends and receives electrical, electromagnetic or optical signals that carry digital data streams representing various types of information.

Network link 120 typically provides data communication through one or more networks to other data devices. For example, network link 120 may provide a connection through local network 122 to a host computer 124 or to data equipment operated by an Internet Service Provider (ISP) 126. ISP 126 in turn provides data communication services through the worldwide packet data communication network, now commonly referred to as the "Internet" 128. Local network 122 and Internet 128 both use electrical, electromagnetic or optical signals that carry digital data streams. The signals through the various networks and the signals on network link 120 and through communication interface 118, which carry the digital data to and from computer system 100, are example forms of carrier waves transporting the information.

Computer system 100 can send messages and receive data, including program code, through the network(s), network link 120, and communication interface 118. In the Internet example, a server 130 might transmit a requested code for an application program through Internet 128, ISP 126, local network 122 and communication interface 118. One such downloaded application may provide for the illumination optimization of the embodiment, for example. The received code may be executed by processor 104 as it is received, and/or stored in storage device 110, or other non-volatile storage for later execution. In this manner, computer system 100 may obtain application code in the form of a carrier wave.

Figure 11:
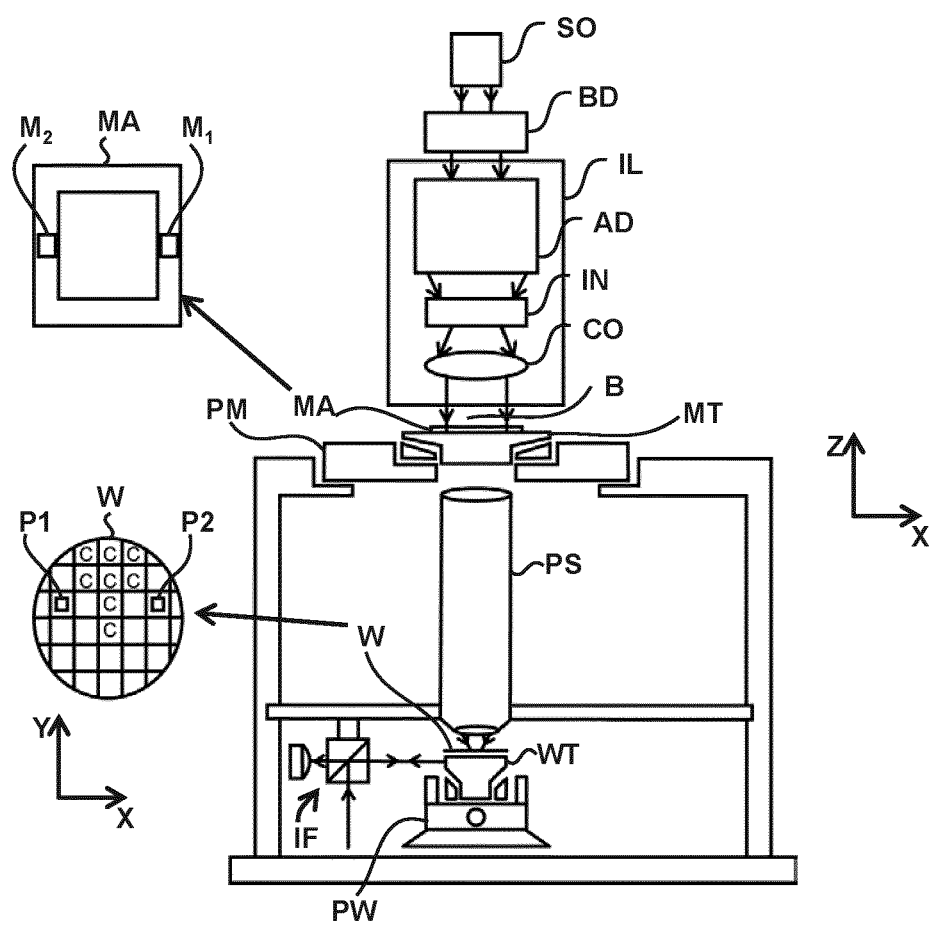
FIG. 11 is a diagram of an exemplary lithographic projection apparatus, according to an embodiment.

FIG. 11 depicts an exemplary lithographic projection apparatus in conjunction with the techniques described herein can be utilized in accordance with an embodiment of the present disclosure. The apparatus comprises:

an illumination system IL, to condition a beam B of radiation. In this particular case, the illumination system also comprises a radiation source SO;

a first object table (e.g., patterning device table) MT provided with a patterning device holder to hold a patterning device MA (e.g., a reticle), and connected to a first positioner to accurately position the patterning device with respect to item PS;

a second object table (substrate table) WT provided with a substrate holder to hold a substrate W (e.g., a resist-coated silicon wafer), and connected to a second positioner to accurately position the substrate with respect to item PS;

a projection system ("lens") PS (e.g., a refractive, catoptric or catadioptric optical system) to image an irradiated portion of the patterning device MA onto a target portion C (e.g., comprising one or more dies) of the substrate W.

As depicted herein, the apparatus is of a transmissive type (i.e., has a transmissive patterning device). However, in general, it may also be of a reflective type, for example (with a reflective patterning device). The apparatus may employ a different kind of patterning device to classic mask; examples include a programmable mirror array or LCD matrix.

The source SO (e.g., a mercury lamp or excimer laser, LPP (laser produced plasma) EUV source) produces a beam of radiation. This beam is fed into an illumination system (illuminator) IL, either directly or after having traversed conditioning means, such as a beam expander Ex, for example. The illuminator IL may comprise adjusting means AD for setting the outer and/or inner radial extent (commonly referred to as σ-outer and σ-inner, respectively) of the intensity distribution in the beam. In addition, it will generally comprise various other components, such as an integrator IN and a condenser CO. In this way, the beam B impinging on the patterning device MA has a desired uniformity and intensity distribution in its cross-section.

It should be noted with regard to FIG. 11 that the source SO may be an integral part of, e.g., within the housing of, the lithographic projection apparatus (as is often the case when the source SO is a mercury lamp, for example), but that it may also be remote from the lithographic projection apparatus, the radiation beam that it produces being led into the apparatus (e.g., with the aid of suitable directing mirrors);

this latter scenario is often the case when the source SO is an excimer laser (e.g., based on KrF, ArF or $F_2$ lasing).

The beam PB subsequently intercepts the patterning device MA, which is held on a patterning device table MT. Having traversed the patterning device MA, the beam B passes through the lens PL, which focuses the beam B onto a target portion C of the substrate W. With the aid of the second positioning means (and interferometric measuring means IF), the substrate table WT can be moved accurately, e.g. so as to position different target portions C in the path of the beam PB. Similarly, the first positioning means can be used to accurately position the patterning device MA with respect to the path of the beam B, e.g., after mechanical retrieval of the patterning device MA from a patterning device library, or during a scan. In general, movement of the object tables MT, WT will be realized with the aid of a long-stroke module (coarse positioning) and a short-stroke module (fine positioning), which are not explicitly depicted in FIG. 11. However, in the case of a stepper (as opposed to a step-and-scan tool) the patterning device table MT may just be connected to a short stroke actuator, or may be fixed.

The depicted tool can be used in two different modes:
In step mode, the patterning device table MT is kept essentially stationary, and an entire patterning device image is projected in one go (i.e., a single "flash") onto a target portion C. The substrate table WT is then shifted in the x and/or y directions so that a different target portion C can be irradiated by the beam PB;
In scan mode, essentially the same scenario applies, except that a given target portion C is not exposed in a single "flash". Instead, the patterning device table MT is movable in a given direction (the so-called "scan direction", e.g., the y direction) with a speed v, so that the projection beam B is caused to scan over a patterning device image; concurrently, the substrate table WT is simultaneously moved in the same or opposite direction at a speed V=Mv, in which M is the magnification of the lens PL (typically, M=¼ or ⅕). In this manner, a relatively large target portion C can be exposed, without having to compromise on resolution.

Figure 12:
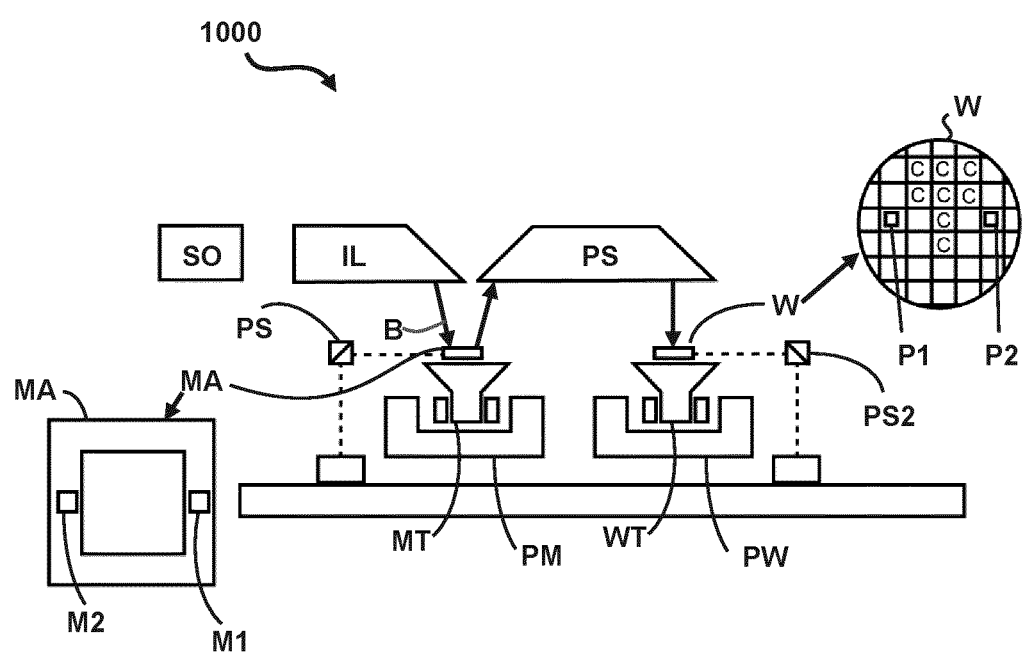
FIG. 12 is a diagram of an exemplary extreme ultraviolet (EUV) lithographic projection apparatus, according to an embodiment.

FIG. 12 depicts another exemplary lithographic projection apparatus 1000 in accordance with an embodiment of the present disclosure. Apparatus 1000 includes:
a source collector module SO to provide radiation.
an illumination system (illuminator) IL configured to condition a radiation beam B (e.g. EUV radiation) from the source collector module SO.
a support structure (e.g. a mask table) MT constructed to support a patterning device (e.g. a mask or a reticle) MA and connected to a first positioner PM configured to accurately position the patterning device;
a substrate table (e.g. a wafer table) WT constructed to hold a substrate (e.g. a resist coated wafer) W and connected to a second positioner PW configured to accurately position the substrate; and
a projection system (e.g. a reflective projection system) PS configured to project a pattern imparted to the radiation beam B by patterning device MA onto a target portion C (e.g. comprising one or more dies) of the substrate W.

As here depicted, the apparatus 1000 is of a reflective type (e.g. employing a reflective mask). It is to be noted that because most materials are absorptive within the EUV wavelength range, the patterning device may have multilayer reflectors comprising, for example, a multi-layer stack of molybdenum and silicon. In one example, the multi-stack reflector has a 40 layer pairs of Molybdenum and Silicon where the thickness of each layer is a quarter wavelength. Even smaller wavelengths may be produced with X-ray lithography. Since most material is absorptive at EUV and x-ray wavelengths, a thin piece of patterned absorbing material on the patterning device topography (e.g., a TaN absorber on top of the multi-layer reflector) defines where features would print (positive resist) or not print (negative resist).

Referring to FIG. 12, the illuminator IL receives an extreme ultra violet radiation beam from the source collector module SO. Methods to produce EUV radiation include, but are not necessarily limited to, converting a material into a plasma state that has at least one element, e.g., xenon, lithium or tin, with one or more emission lines in the EUV range. In one such method, often termed laser produced plasma ("LPP") the plasma can be produced by irradiating a fuel, such as a droplet, stream or cluster of material having the line-emitting element, with a laser beam. The source collector module SO may be part of an EUV radiation system including a laser, not shown in FIG. 12, for providing the laser beam exciting the fuel. The resulting plasma emits output radiation, e.g., EUV radiation, which is collected using a radiation collector, disposed in the source collector module. The laser and the source collector module may be separate entities, for example when a CO2 laser is used to provide the laser beam for fuel excitation.

In such cases, the laser is not considered to form part of the lithographic apparatus and the radiation beam is passed from the laser to the source collector module with the aid of a beam delivery system comprising, for example, suitable directing mirrors and/or a beam expander. In other cases the radiation source may be an integral part of the source collector module, for example when the radiation source is a discharge produced plasma EUV generator, often termed as a DPP radiation source.

The illuminator IL may comprise an adjuster for adjusting the angular intensity distribution of the radiation beam. Generally, at least the outer and/or inner radial extent (commonly referred to as G-outer and G-inner, respectively) of the intensity distribution in a pupil plane of the illuminator can be adjusted. In addition, the illuminator IL may comprise various other components, such as facetted field and pupil mirror devices. The illuminator may be used to condition the radiation beam, to have a desired uniformity and intensity distribution in its cross section.

The radiation beam B is incident on the patterning device (e.g., mask) MA, which is held on the support structure (e.g., mask table) MT, and is patterned by the patterning device. After being reflected from the patterning device (e.g. mask) MA, the radiation beam B passes through the projection system PS, which focuses the beam onto a target portion C of the substrate W. With the aid of the second positioner PW and position sensor PS2 (e.g. an interferometric device, linear encoder or capacitive sensor), the substrate table WT can be moved accurately, e.g. so as to position different target portions C in the path of the radiation beam B. Similarly, the first positioner PM and another position sensor PS1 can be used to accurately position the patterning device (e.g. mask) MA with respect to the path of the radiation beam B. Patterning device (e.g. mask) MA and substrate W may be aligned using patterning device alignment marks M1, M2 and substrate alignment marks P1, P2.

The depicted apparatus 1000 could be used in at least one of the following modes:
1. In step mode, the support structure (e.g. mask table) MT and the substrate table WT are kept essentially stationary, while an entire pattern imparted to the radiation beam is projected onto a target portion C at one time (i.e. a single static exposure). The substrate table WT is then shifted in the X and/or Y direction so that a different target portion C can be exposed.

2. In scan mode, the support structure (e.g. mask table) MT and the substrate table WT are scanned synchronously while a pattern imparted to the radiation beam is projected onto a target portion C (i.e. a single dynamic exposure). The velocity and direction of the substrate table WT relative to the support structure (e.g. mask table) MT may be determined by the (de-)magnification and image reversal characteristics of the projection system PS.

3. In another mode, the support structure (e.g. mask table) MT is kept essentially stationary holding a programmable patterning device, and the substrate table WT is moved or scanned while a pattern imparted to the radiation beam is projected onto a target portion C. In this mode, generally a pulsed radiation source is employed and the programmable patterning device is updated as required after each movement of the substrate table WT or in between successive radiation pulses during a scan. This mode of operation can be readily applied to maskless lithography that utilizes programmable patterning device, such as a programmable mirror array of a type as referred to above.

Figure 13:
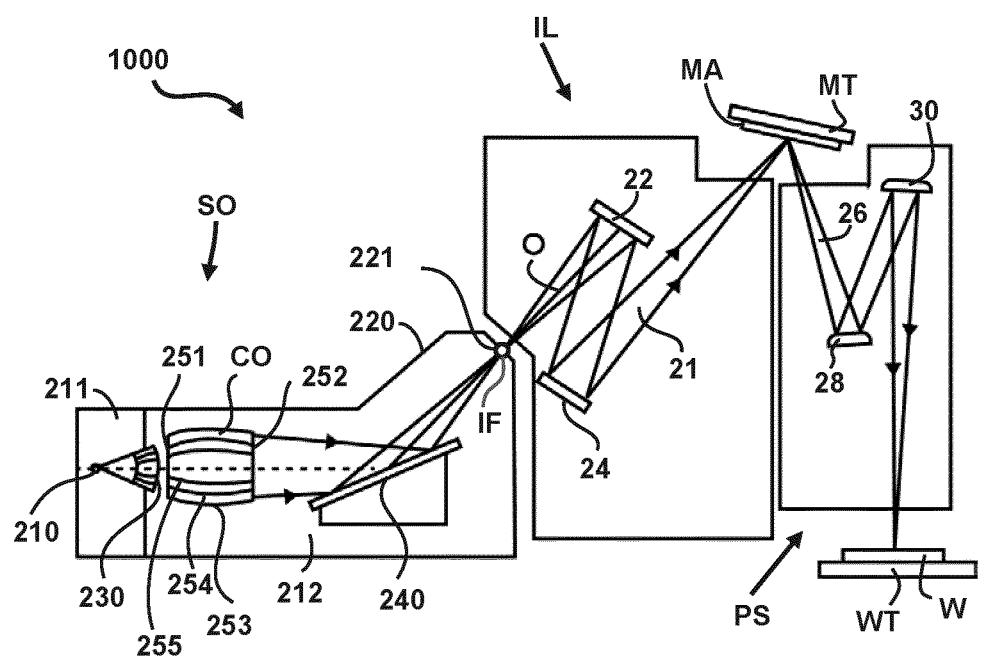
FIG. 13 is a more detailed view of the exemplary apparatus in FIG. 12, according to an embodiment.

FIG. 13 shows the apparatus 1000 in more detail, including the source collector module SO, the illumination system IL, and the projection system PS. The source collector module SO is constructed and arranged such that a vacuum environment can be maintained in an enclosing structure 220 of the source collector module SO. An EUV radiation emitting plasma 210 may be formed by a discharge produced plasma radiation source. EUV radiation may be produced by a gas or vapor, for example Xe gas, Li vapor or Sn vapor in which the very hot plasma 210 is created to emit radiation in the EUV range of the electromagnetic spectrum. The very hot plasma 210 is created by, for example, an electrical discharge causing an at least partially ionized plasma. Partial pressures of, for example, 10 Pa of Xe, Li, Sn vapor or any other suitable gas or vapor may be required for efficient generation of the radiation. In an embodiment, a plasma of excited tin (Sn) is provided to produce EUV radiation.

The radiation emitted by the hot plasma 210 is passed from a source chamber 211 into a collector chamber 212 via an optional gas barrier or contaminant trap 230 (in some cases also referred to as contaminant barrier or foil trap) which is positioned in or behind an opening in source chamber 211. The contaminant trap 230 may include a channel structure. Contamination trap 230 may also include a gas barrier or a combination of a gas barrier and a channel structure. The contaminant trap or contaminant barrier 230 further indicated herein at least includes a channel structure, as known in the art.

The collector chamber 211 may include a radiation collector CO which may be a so-called grazing incidence collector. Radiation collector CO has an upstream radiation collector side 251 and a downstream radiation collector side 252. Radiation that traverses collector CO can be reflected off a grating spectral filter 240 to be focused in a virtual source point IF along the optical axis indicated by the dot-dashed line 'O'. The virtual source point IF is commonly referred to as the intermediate focus, and the source collector module is arranged such that the intermediate focus IF is located at or near an opening 221 in the enclosing structure 220. The virtual source point IF is an image of the radiation emitting plasma 210.

Subsequently the radiation traverses the illumination system IL, which may include a facetted field mirror device 22 and a facetted pupil mirror device 24 arranged to provide a desired angular distribution of the radiation beam 21, at the patterning device MA, as well as a desired uniformity of radiation intensity at the patterning device MA. Upon reflection of the beam of radiation 21 at the patterning device MA, held by the support structure MT, a patterned beam 26 is formed and the patterned beam 26 is imaged by the projection system PS via reflective elements 28, 30 onto a substrate W held by the substrate table WT.

More elements than shown may generally be present in illumination optics unit IL and projection system PS. The grating spectral filter 240 may optionally be present, depending upon the type of lithographic apparatus. Further, there may be more mirrors present than those shown in the Figures, for example there may be 1-6 additional reflective elements present in the projection system PS than shown in FIG. 13.

Collector optic CO, as illustrated in FIG. 13, is depicted as a nested collector with grazing incidence reflectors 253, 254 and 255, just as an example of a collector (or collector mirror). The grazing incidence reflectors 253, 254 and 255 are disposed axially symmetric around the optical axis O and a collector optic CO of this type is desirably used in combination with a discharge produced plasma radiation source.

Figure 14:
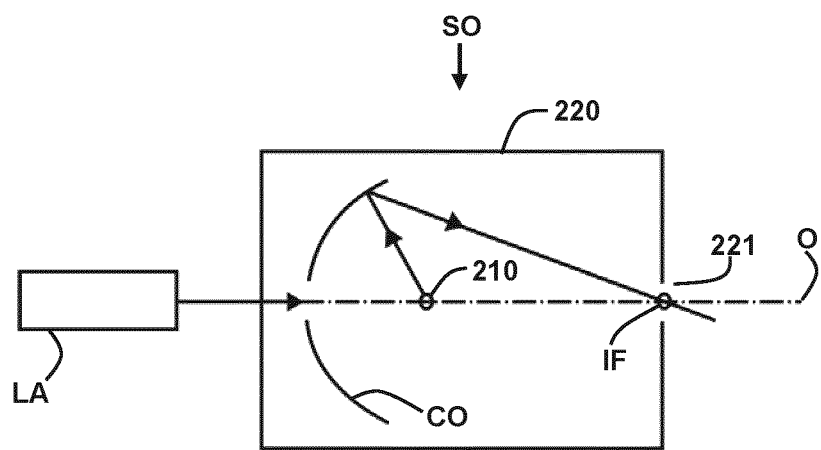
FIG. 14 is a more detailed view of the source collector module of the apparatus of FIG. 12 and FIG. 13, according to an embodiment.

Alternatively, the source collector module SO may be part of an LPP radiation system as shown in FIG. 14. A laser LAS is arranged to deposit laser energy into a fuel, such as xenon (Xe), tin (Sn) or lithium (Li), creating the highly ionized plasma 210 with electron temperatures of several 10's of eV. The energetic radiation generated during de-excitation and recombination of these ions is emitted from the plasma, collected by a near normal incidence collector optic CO and focused onto the opening 221 in the enclosing structure 220.

The concepts disclosed herein may simulate or mathematically model any generic imaging system for imaging sub wavelength features, and may be especially useful with emerging imaging technologies capable of producing wavelengths of an increasingly smaller size. Emerging technologies already in use include EUV (extreme ultra violet) lithography that is capable of producing a 193 nm wavelength with the use of an ArF laser, and even a 157 nm wavelength with the use of a Fluorine laser. Moreover, EUV lithography is capable of producing wavelengths within a range of 20-5 nm by using a synchrotron or by hitting a material (either solid or a plasma) with high energy electrons in order to produce photons within this range.

While the concepts disclosed herein may be used for imaging on a substrate such as a silicon wafer, it shall be understood that the disclosed concepts may be used with any type of lithographic imaging systems, e.g., those used for imaging on substrates other than silicon wafers.

Although specific reference may be made in this text to the use of embodiments in the manufacture of ICs, it should be understood that the embodiments herein may have many other possible applications. For example, it may be employed in the manufacture of integrated optical systems, guidance and detection patterns for magnetic domain memories, liquid-crystal displays (LCDs), thin film magnetic heads, micromechanical systems (MEMs), etc. The skilled artisan will appreciate that, in the context of such alternative applications, any use of the terms "reticle", "wafer" or "die" herein may be considered as synonymous or interchangeable with the more general terms "patterning device", "substrate" or "target portion", respectively. The substrate referred to herein may be processed, before or after exposure, in for example a track (a tool that typically applies a layer of resist to a substrate and develops the exposed resist) or a metrology or inspection tool. Where applicable, the disclosure herein may be applied to such and other substrate processing tools. Further, the substrate may be processed more than once, for example in order to create, for example, a multi-layer IC, so that the term substrate used herein may also refer to a substrate that already contains multiple processed layers.

In the present document, the terms "radiation" and "beam" as used herein encompass all types of electromagnetic radiation, including ultraviolet radiation (e.g. with a wavelength of about 365, about 248, about 193, about 157 or about 126 nm) and extreme ultra-violet (EUV) radiation (e.g. having a wavelength in the range of 5-20 nm), as well as particle beams, such as ion beams or electron beams.

The terms "optimizing" and "optimization" as used herein refers to or means adjusting a patterning apparatus (e.g., a lithography apparatus), a patterning process, etc. such that results and/or processes have more desirable characteristics, such as higher accuracy of projection of a design pattern on a substrate, a larger process window, etc. Thus, the term "optimizing" and "optimization" as used herein refers to or means a process that identifies one or more values for one or more parameters that provide an improvement, e.g. a local optimum, in at least one relevant metric, compared to an initial set of one or more values for those one or more parameters. "Optimum" and other related terms should be construed accordingly. In an embodiment, optimization steps can be applied iteratively to provide further improvements in one or more metrics.

Aspects of the invention can be implemented in any convenient form. For example, an embodiment may be implemented by one or more appropriate computer programs which may be carried on an appropriate carrier medium which may be a tangible carrier medium (e.g. a disk) or an intangible carrier medium (e.g. a communications signal). Embodiments of the invention may be implemented using suitable apparatus which may specifically take the form of a programmable computer running a computer program arranged to implement a method as described herein. Thus, embodiments of the disclosure may be implemented in hardware, firmware, software, or any combination thereof. Embodiments of the disclosure may also be implemented as instructions stored on a machine-readable medium, which may be read and executed by one or more processors. A machine-readable medium may include any mechanism for storing or transmitting information in a form readable by a machine (e.g., a computing device). For example, a machine-readable medium may include read only memory (ROM); random access memory (RAM); magnetic disk storage media; optical storage media; flash memory devices; electrical, optical, acoustical or other forms of propagated signals (e.g. carrier waves, infrared signals, digital signals, etc.), and others. Further, firmware, software, routines, instructions may be described herein as performing certain actions. However, it should be appreciated that such descriptions are merely for convenience and that such actions in fact result from computing devices, processors, controllers, or other devices executing the firmware, software, routines, instructions, etc.

In block diagrams, illustrated components are depicted as discrete functional blocks, but embodiments are not limited to systems in which the functionality described herein is organized as illustrated. The functionality provided by each of the components may be provided by software or hardware modules that are differently organized than is presently depicted, for example such software or hardware may be intermingled, conjoined, replicated, broken up, distributed (e.g. within a data center or geographically), or otherwise differently organized. The functionality described herein may be provided by one or more processors of one or more computers executing code stored on a tangible, non-transitory, machine readable medium. In some cases, third party content delivery networks may host some or all of the information conveyed over networks, in which case, to the extent information (e.g., content) is said to be supplied or otherwise provided, the information may be provided by sending instructions to retrieve that information from a content delivery network.

Unless specifically stated otherwise, as apparent from the discussion, it is appreciated that throughout this specification discussions utilizing terms such as "processing," "computing," "calculating," "determining" or the like refer to actions or processes of a specific apparatus, such as a special purpose computer or a similar special purpose electronic processing/computing device.

Embodiments of the present disclosure can be further described by the following clauses.

1. A method of determining a mask pattern for a target pattern to be printed on a substrate, the method comprising:
    partitioning a portion of a design layout including the target pattern into a plurality of cells with reference to a given location on the target pattern;
    assigning a plurality of variables within a particular cell of the plurality of cells, the particular cell including the target pattern or a portion thereof; and
    determining, based on values of the plurality of variables, the mask pattern for the target pattern based on a performance metric of a patterning process, wherein the determining the mask pattern comprises:
        simulating, using the target pattern and the plurality of variables, the patterning process to determine the values of the plurality of variables based on the performance metric; and
        generating, based on the determined values of the plurality of variables, the mask pattern for the target pattern.
2. The method of clause 1, wherein the partitioning the portion of the design layout is based on a Voronoi method, wherein boundaries of each cell of the plurality of cells are determined based on a distance between a boundary to the given location on the target pattern.
3. The method of clause 2, wherein the boundaries of each cell of the plurality of cells are defined to cause points in the each cell to be closest to the given location than other locations within the design layout.
4. The method of any of clauses 1-3, wherein the given location is a center of the target pattern, a point on an edge of the target pattern, or a point having a predefined geometric relation to the target pattern.
5. The method of any of clauses 1-4, wherein the design layout is associated with a first coordinate system, and the plurality of cells are associated with a second coordinate system, wherein the values of the plurality of variables are represented in the second coordinate system and are convertible to values represented in the first coordinate system.
6. The method of clause 5, wherein the second coordinate system comprises: an origin at a base point of each cell; a first axis perpendicular to the edge; and a second axis perpendicular to the first axis.

7. The method of clause 6, wherein the base point of the cell is a point placed at an edge of the target pattern.
8. The method of any of clauses 5-7, wherein the determining of the mask pattern is an iterative process comprising:
    (a) adjusting values of one or more variables of the plurality of variables of the particular cell;
    (b) converting the adjusted values of the one or more variables to the first coordinate system of the design layout;
    (c) determining, via simulating the patterning process using converted values of the one or more variables, the performance metric of the patterning process;
    (d) determining whether the performance metric is within the desired performance range;
    (e) responsive to the performance metric being within the desired performance range, determining the mask pattern based on the adjusted values; and
    (f) responsive to the performance metric not being the desired performance range, performing (a)-(e).
9. The method of clause 8, wherein the converting the adjusted values of the one or more variables comprises:
    establishing a correlation between the first coordinate system of the design layout and the second coordinate system of the plurality of cells;
    converting, based on the correlation, the adjusted values of the one or more variables from the second coordinate system to the first coordinate system of the design layout; and
    simulating the patterning process using the converted values of the one or more variables.
10. The method of any of clauses 1-9, wherein the plurality of variables are correlated to a plurality of pixels, and a value of a given variable of the plurality of variables is intensity associated with a given pixel or combination of pixels of the plurality of pixels, wherein the intensity is indicative of an edge of a feature to be included in the mask pattern.
11. The method of any of clauses 1-10, wherein the generating of the mask pattern for the target patterns comprises:
converting the values of the plurality of variables into pixelated images, which is a mathematical representation of grayscale mask image, or which generates a curvilinear mask pattern as a level-set function.
12. The method of any of clauses 1-11, further comprising:
    applying the values of the plurality of variables determined using the target pattern to other instances of the target pattern in the design layout; and
    determining, based on the applied values to the instances of the target pattern, the mask pattern to cause multiple instances of the target pattern to be modified to generate the mask pattern.
13. The method of any of clauses 1-12, further comprising:
    determining a symmetric portion between the plurality of the cells or within the particular cell; and
    assigning a same set of variables to the symmetric portion of each cell of the plurality of cell.
14. The method of clause 13, wherein the symmetric portion is determined based on a geometric similarity between the plurality of cells or within the particular cell.
15. The method of any of clauses 1-14, further comprising:
    performing an optical proximity correction (OPC) process using the mask pattern as an initial pattern, wherein the OPC process comprises modifying the mask pattern to determine an optical proximity corrected mask pattern.
16. The method of any of clauses 1-15, wherein the performance metric comprises: an edge placement error between the target pattern and a simulated pattern generated by the simulation of the patterning process, a number of extra and insufficient printing of mask features compared to the target patterns, critical dimension (CD) of the simulated pattern, and/or a CD error between the simulated pattern and the target pattern.
17. The method of any of clauses 1-16, further comprising:
    classifying the values of the plurality of variables of the plurality of cells based on geometry of corresponding target patterns;
    storing the values of the plurality of the variables in a result library; and
    determining, based on the result library, a mask pattern corresponding to a full-chip layout.
18. The method of clause 17, wherein the determining the mask pattern for the full-chip layout comprises:
    identifying patterns of the full-chip layout by geometrically matching the full-chip layout to target patterns stored in the result library;
    extracting values of the plurality of variables corresponding to the identified pattern; and
    applying the extracted values to determine the mask pattern for the full-chip layout.
19. A non-transitory computer-readable media comprising instructions that, when executed by one or more processors, cause operations comprising:
    partitioning a portion of a design layout including a target pattern into a plurality of cells with reference to a given location on the target pattern;
    assigning a plurality of variables within a particular cell of the plurality of cells, the particular cell including the target pattern or a portion thereof; and
    determining, based on values of the plurality of variables, a mask pattern for the target pattern such that a performance metric of a patterning process utilizing the mask pattern is within a desired performance range, wherein the determining of the mask pattern comprises:
        simulating, using the target pattern and the plurality of variables, the patterning process to determine the values of the plurality of variables such that the performance metric of the patterning process is within the desired performance range; and
        generating, based on the determined values of the plurality of variables, the mask pattern for the target pattern.
20. The non-transitory computer-readable media of clause 19, wherein the partitioning the portion of the design layout is based on Voronoi partitioning, wherein boundaries of each cell of the plurality of cells are determined based on a distance between a boundary and the given location on the target pattern.
21. The non-transitory computer-readable media of any of clauses 19-20, wherein the design layout is associated with a first coordinate system, and the plurality of cells are associated with a second coordinate system, wherein the values of the plurality of variables are in the second coordinate system and are convertible to values in the first coordinate system.

22. The non-transitory computer-readable media of clause 21, wherein the second coordinate system is defined such that an origin is at a base point of each cell, a first axis is perpendicular to an edge, a second axis is perpendicular the first axis.
23. The non-transitory computer-readable media of any of clauses 21-22, wherein the determining of the mask pattern is an iterative process comprising:
   (a) adjusting values of one or more variables of the plurality of variables of the particular cell;
   (b) converting the adjusted values of the one or more variables to the first coordinate system of the design layout;
   (c) determining, via simulating the patterning process using the converted values of the one or more variables, the performance metric of the patterning process;
   (d) determining whether the performance metric is within the desired performance range;
   (e) responsive to the performance metric being within the desired performance range, determining the mask pattern based on the adjusted values; and
   (f) responsive to the performance metric not being the desired performance range, performing steps (a)-(e).
24. The non-transitory computer-readable media of clause 23, wherein the converting the adjusted values of the one or more variables comprises:
   establishing a correlation between the first coordinate system of the design layout and the second coordinate system of the plurality of cells;
   converting, based on the correlation, the adjusted values of the one or more variables from the second coordinate system to the first coordinate system of the design layout; and
   simulating the patterning process using the converted values of the one or more variables.
25. The non-transitory computer-readable media of any of clauses 19-24, wherein the plurality of variables are correlated to a plurality of pixels, and a value of a given variable of the plurality of variables is intensity associated with a given pixel or combination of pixels of the plurality of pixels, wherein the intensity is indicative of an edge of a feature to be included in the mask pattern.
26. The non-transitory computer-readable media of any of clauses 19-25, further causing operation comprising:
   applying the values of the plurality variables determined using the target pattern to other instances of the target pattern in the design layout; and
   determining, based on the applied values to the instances of the target pattern, the mask pattern so that all instances of the target pattern are modified in a consistent manner to generate the mask pattern.
27. The non-transitory computer-readable media of any of clauses 19-26, further causing operations comprising:
   determining a symmetric portion between the plurality of the cells or within the particular cell; and
   assigning a same set of variables to the symmetric portion of each cell of the plurality of cell.
28. The non-transitory computer-readable media of any of clauses 19-27, further comprising:
   classifying the values of the plurality of variables of the plurality of cells based on the geometry of corresponding target patterns;
   storing the values of the plurality of the variables in a result library; and
   determining, based on the result library, a mask pattern corresponding to a full-chip layout.
29. The non-transitory computer-readable media of clause 28, wherein the determining of the mask pattern for the full-chip layout comprises:
   identifying patterns of the full-chip layout by geometrically matching the full-chip layout to the target patterns stored in the result library;
   extracting the values of the plurality variable corresponding to the identified pattern; and
   applying the of the extracted values to determine the mask pattern for the full-chip layout.

The reader should appreciate that the present application describes several inventions. Rather than separating those inventions into multiple isolated patent applications, these inventions have been grouped into a single document because their related subject matter lends itself to economies in the application process. But the distinct advantages and aspects of such inventions should not be conflated. In some cases, embodiments address all of the deficiencies noted herein, but it should be understood that the inventions are independently useful, and some embodiments address only a subset of such problems or offer other, unmentioned benefits that will be apparent to those of skill in the art reviewing the present disclosure. Due to costs constraints, some inventions disclosed herein may not be presently claimed and may be claimed in later filings, such as continuation applications or by amending the present claims. Similarly, due to space constraints, neither the Abstract nor the Summary sections of the present document should be taken as containing a comprehensive listing of all such inventions or all aspects of such inventions.

It should be understood that the description and the drawings are not intended to limit the present disclosure to the particular form disclosed, but to the contrary, the intention is to cover all modifications, equivalents, and alternatives falling within the spirit and scope of the inventions as defined by the appended claims.

Modifications and alternative embodiments of various aspects of the inventions will be apparent to those skilled in the art in view of this description. Accordingly, this description and the drawings are to be construed as illustrative only and are for the purpose of teaching those skilled in the art the general manner of carrying out the inventions. It is to be understood that the forms of the inventions shown and described herein are to be taken as examples of embodiments. Elements and materials may be substituted for those illustrated and described herein, parts and processes may be reversed or omitted, certain features may be utilized independently, and embodiments or features of embodiments may be combined, all as would be apparent to one skilled in the art after having the benefit of this description. Changes may be made in the elements described herein without departing from the spirit and scope of the invention as described in the following claims. Headings used herein are for organizational purposes only and are not meant to be used to limit the scope of the description.

As used throughout this application, the word "may" is used in a permissive sense (i.e., meaning having the potential to), rather than the mandatory sense (i.e., meaning must). The words "include", "including", and "includes" and the like mean including, but not limited to. As used throughout this application, the singular forms "a," "an," and "the" include plural referents unless the content explicitly indicates otherwise. Thus, for example, reference to "an" element or "a" element includes a combination of two or more elements, notwithstanding use of other terms and phrases for one or more elements, such as "one or more." The term "or" is, unless indicated otherwise, non-exclusive, i.e., encompassing both "and" and "or." Terms describing conditional relationships, e.g., "in response to X, Y," "upon X, Y,", "if X, Y," "when X, Y," and the like, encompass causal relationships in which the antecedent is a necessary causal condition, the antecedent is a sufficient causal condition, or the antecedent is a contributory causal condition of the consequent, e.g., "state X occurs upon condition Y obtaining" is generic to "X occurs solely upon Y" and "X occurs upon Y and Z." Such conditional relationships are not limited to consequences that instantly follow the antecedent obtaining, as some consequences may be delayed, and in conditional statements, antecedents are connected to their consequents, e.g., the antecedent is relevant to the likelihood of the consequent occurring. Statements in which a plurality of attributes or functions are mapped to a plurality of objects (e.g., one or more processors performing steps A, B, C, and D) encompasses both all such attributes or functions being mapped to all such objects and subsets of the attributes or functions being mapped to subsets of the attributes or functions (e.g., both all processors each performing steps A-D, and a case in which processor 1 performs step A, processor 2 performs step B and part of step C, and processor 3 performs part of step C and step D), unless otherwise indicated. Further, unless otherwise indicated, statements that one value or action is "based on" another condition or value encompass both instances in which the condition or value is the sole factor and instances in which the condition or value is one factor among a plurality of factors. Unless otherwise indicated, statements that "each" instance of some collection have some property should not be read to exclude cases where some otherwise identical or similar members of a larger collection do not have the property, i.e., each does not necessarily mean each and every. References to selection from a range includes the end points of the range.

In the above description, any processes, descriptions or blocks in flowcharts should be understood as representing modules, segments or portions of code which include one or more executable instructions for implementing specific logical functions or steps in the process, and alternate implementations are included within the scope of the exemplary embodiments of the present advancements in which functions can be executed out of order from that shown or discussed, including substantially concurrently or in reverse order, depending upon the functionality involved, as would be understood by those skilled in the art.

To the extent certain U.S. patents, U.S. patent applications, PCT patent applications or publications, or other materials (e.g., articles) have been incorporated by reference, the text of such U.S. patents, U.S. patent applications, and other materials is only incorporated by reference to the extent that no conflict exists between such material and the statements and drawings set forth herein. In the event of such conflict, any such conflicting text in such incorporated by reference U.S. patents, U.S. patent applications, and other materials is specifically not incorporated by reference herein.

While certain embodiments have been described, these embodiments have been presented by way of example only, and are not intended to limit the scope of the present disclosures. Indeed, the novel methods, apparatuses and systems described herein can be embodied in a variety of other forms; furthermore, various omissions, substitutions and changes in the form of the methods, apparatuses and systems described herein can be made without departing from the spirit of the present disclosures. The accompanying claims and their equivalents are intended to cover such forms or modifications as would fall within the scope and spirit of the present disclosures.

The invention claimed is:

1. A method of determining a mask pattern for a target pattern to be printed on a substrate, the method comprising:
    partitioning a portion of a design layout including the target pattern into a plurality of cells with reference to a given location on the target pattern;
    assigning a plurality of variables within a particular cell of the plurality of cells, the particular cell including the target pattern or a portion thereof; and
    determining, based on values of the plurality of variables, the mask pattern for the target pattern based on a performance metric of a patterning process, wherein the determining the mask pattern comprises:
        simulating, by a hardware computer using the target pattern and the plurality of variables, the patterning process to determine the values of the plurality of variables based on the performance metric; and
        generating, based on the determined values of the plurality of variables, the mask pattern for the target pattern.

2. The method of claim 1, wherein the partitioning the portion of the design layout is based on a Voronoi method, and wherein one or more boundaries of each cell of the plurality of cells are determined based on a distance between a boundary to the given location on the target pattern.

3. The method of claim 2, wherein the one or more boundaries of each cell of the plurality of cells are defined to cause points in the each cell to be closest to the given location than other locations within the design layout.

4. The method of claim 1, wherein the given location is a center of the target pattern, a point on an edge of the target pattern, or a point having a predefined geometric relation to the target pattern.

5. The method of claim 1, wherein the design layout is associated with a first coordinate system, and the plurality of cells are associated with a second coordinate system, wherein the values of the plurality of variables are represented in the second coordinate system and are convertible to values represented in the first coordinate system.

6. The method of claim 5, wherein the determining of the mask pattern is an iterative process comprising:
    (a) adjusting values of one or more variables of the plurality of variables of the particular cell;
    (b) converting the adjusted values of the one or more variables to the first coordinate system of the design layout;
    (c) determining, via simulating the patterning process using converted values of the one or more variables, the performance metric of the patterning process;
    (d) determining whether the performance metric is within the desired performance range;
    (e) responsive to the performance metric being within the desired performance range, determining the mask pattern based on the adjusted values; and
    (f) responsive to the performance metric not being within the desired performance range, performing (a)-(e).

7. The method of claim 6, wherein the converting the adjusted values of the one or more variables comprises:
    establishing a correlation between the first coordinate system of the design layout and the second coordinate system of the plurality of cells;
    converting, based on the correlation, the adjusted values of the one or more variables from the second coordinate system to the first coordinate system of the design layout; and simulating the patterning process using the converted values of the one or more variables.

8. The method of claim 1, wherein the plurality of variables are correlated to a plurality of pixels, and a value of a given variable of the plurality of variables is intensity associated with a given pixel or combination of pixels of the plurality of pixels, wherein the intensity is indicative of an edge of a feature to be included in the mask pattern.

9. The method of claim 1, wherein the generating of the mask pattern for the target pattern comprises converting the values of the plurality of variables into a pixelated image, which is a mathematical representation of a grayscale mask image, or which generates a curvilinear mask pattern as a level-set function.

10. The method of claim 1, further comprising:
applying the values of the plurality of variables determined using the target pattern to other instances of the target pattern in the design layout; and
determining, based on the applied values to the instances of the target pattern, the mask pattern to cause multiple instances of the target pattern to be modified to generate the mask pattern.

11. The method of claim 1, further comprising:
determining a symmetric portion between the plurality of the cells or within the particular cell; and
assigning a same set of variables to the symmetric portion of each cell of the plurality of cells.

12. The method of claim 11, wherein the symmetric portion is determined based on a geometric similarity between the plurality of cells or within the particular cell.

13. The method of claim 1, wherein the performance metric comprises: an edge placement error between the target pattern and a simulated pattern generated by the simulation of the patterning process, a number of extra and insufficient printing of mask features compared to the target pattern, critical dimension (CD) of the simulated pattern, and/or a CD error between the simulated pattern and the target pattern.

14. The method of claim 1, further comprising:
classifying the values of the plurality of variables of the plurality of cells based on geometry of a corresponding target pattern;
storing the values of the plurality of the variables in a result library; and
determining, based on the result library, a mask pattern corresponding to a full-chip layout.

15. The method of claim 14, wherein the determining the mask pattern for the full-chip layout comprises:
identifying one or more patterns of the full-chip layout by geometrically matching the full-chip layout to one or more target patterns stored in the result library;
extracting values of the plurality of variables corresponding to the identified one or more patterns; and
applying the extracted values to determine the mask pattern for the full-chip layout.

16. A non-transitory computer-readable media comprising instructions therein, the instructions, when executed by one or more processors, configured to cause the one or more processors to at least:
partition a portion of a design layout including a target pattern to be printed on a substrate into a plurality of cells with reference to a given location on the target pattern;
assign a plurality of variables within a particular cell of the plurality of cells, the particular cell including the target pattern or a portion thereof; and
determine, based on values of the plurality of variables, a mask pattern for the target pattern based on a performance metric of a patterning process, wherein the determination of the mask pattern comprises:
simulation, using the target pattern and the plurality of variables, of the patterning process to determine the values of the plurality of variables based on the performance metric; and
generation, based on the determined values of the plurality of variables, of the mask pattern for the target pattern.

17. The media of claim 16, wherein the instructions configured to cause the one or more processors to partition the portion of the design layout are configured to do based on a Voronoi method, and wherein one or more boundaries of each cell of the plurality of cells are determined based on a distance between a boundary to the given location on the target pattern.

18. The media of claim 17, wherein the one or more boundaries of each cell of the plurality of cells are defined to cause points in the each cell to be closest to the given location than other locations within the design layout.

19. The media of claim 16, wherein the design layout is associated with a first coordinate system, and the plurality of cells are associated with a second coordinate system, wherein the values of the plurality of variables are represented in the second coordinate system and are convertible to values represented in the first coordinate system.

20. The media of claim 16, wherein the plurality of variables are correlated to a plurality of pixels, and a value of a given variable of the plurality of variables is intensity associated with a given pixel or combination of pixels of the plurality of pixels, wherein the intensity is indicative of an edge of a feature to be included in the mask pattern.

* * * * *